(12) United States Patent
Simpson et al.

(10) Patent No.: US 11,555,804 B2
(45) Date of Patent: Jan. 17, 2023

(54) LIQUID CHROMATOGRAPHY THERMAL SYSTEM WITH THERMAL STATUS DETECTION

(71) Applicant: Waters Technologies Corporation, Milford, MA (US)

(72) Inventors: David A. Simpson, Hopkinton, MA (US); Cameron Chaput, Philadelphia, PA (US); Miguel M. Soares, Norton, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 561 days.

(21) Appl. No.: 16/516,888

(22) Filed: Jul. 19, 2019

(65) Prior Publication Data

US 2020/0025724 A1 Jan. 23, 2020

Related U.S. Application Data

(60) Provisional application No. 62/700,995, filed on Jul. 20, 2018.

(51) Int. Cl.
*G01N 25/00* (2006.01)
*G01N 30/30* (2006.01)
(Continued)

(52) U.S. Cl.
CPC ............. *G01N 30/30* (2013.01); *G01N 25/04* (2013.01); *G01N 30/88* (2013.01); *G01N 2030/027* (2013.01)

(58) Field of Classification Search
CPC combination set(s) only.
See application file for complete search history.

(56) References Cited

U.S. PATENT DOCUMENTS 4,601,587 A * 7/1986 Mathiprakasam ..... G01N 25/04
374/25
5,921,092 A 7/1999 Behr et al.
(Continued)

FOREIGN PATENT DOCUMENTS

EP 1182439 A1 2/2002
GB 2475553 A * 5/2011 ............. B64D 15/20
(Continued)

OTHER PUBLICATIONS

International Preliminary Report on Patentability in PCT/US2019/042599 dated Feb. 4, 2021.
(Continued)

*Primary Examiner* — Lisa M Caputo
*Assistant Examiner* — Nasir U. Ahmed
(74) *Attorney, Agent, or Firm* — Schmeiser, Olsen & Watts LLP

(57) ABSTRACT

A liquid chromatography system including a solvent delivery system, a sample delivery system in fluidic communication with solvent delivery system, a liquid chromatography column located downstream from the solvent delivery system and the sample delivery system, a detector located downstream from the liquid chromatography column, a thermal chamber housing at least one of the solvent delivery system, the sample delivery system, the liquid chromatography column and the detector, an engine configured to control the temperature in the thermal chamber, a heatsink operably connected to the engine, a first temperature sensor in the thermal chamber, a second temperature sensor, and a computer system configured to receive temperature information from each of the first and second temperature sensors, and implement a method for controlling temperature in the thermal chamber.

30 Claims, 15 Drawing Sheets

(51) Int. Cl.
*G01N 30/88* (2006.01)
*G01N 25/04* (2006.01)
*G01N 30/02* (2006.01)

(56) References Cited

U.S. PATENT DOCUMENTS

| | | |
|---|---|---|
| 6,706,091 B1 * | 3/2004 | Robinson ............... G01N 30/30 |
| | | 95/87 |
| 8,549,867 B2 | 10/2013 | Crawford et al. |
| 8,997,509 B1 | 4/2015 | Wiggs |
| 9,772,124 B2 | 9/2017 | Wintemute et al. |
| 2007/0234792 A1 * | 10/2007 | Durand ................. F02D 41/005 |
| | | 123/563 |
| 2011/0100041 A1 | 5/2011 | Crawford et al. |
| 2012/0285872 A1 * | 11/2012 | Shreve .................... F25B 21/02 |
| | | 62/3.6 |
| 2014/0201557 A1 | 7/2014 | Darrington et al. |
| 2014/0260368 A1 | 9/2014 | Wintemute et al. |
| 2015/0355061 A1 | 12/2015 | Inoue |

FOREIGN PATENT DOCUMENTS

| | | |
|---|---|---|
| WO | 201185359 A1 | 7/2011 |
| WO | 2011085337 A1 | 7/2011 |

OTHER PUBLICATIONS

International Search Report and Written Opinion in related international patent application No. PCT/US2019/042599, dated Oct. 24, 2019; 15 pages.

* cited by examiner

LIQUID CHROMATOGRAPHY THERMAL SYSTEM WITH THERMAL STATUS DETECTION

RELATED APPLICATIONS

This application is a non-provisional patent application claiming priority to U.S. Provisional Patent Application No. 62/700,995, filed Jul. 20, 2018, entitled "Liquid Chromatography Thermal System With Ice Detection and Prevention," which is incorporated herein by reference.

FIELD OF THE INVENTION

The invention relates generally to liquid chromatography systems. More particularly, the invention relates to liquid chromatography thermal systems, or liquid chromatography sample managers and/or sample organizers, with associated systems and methods for detecting the thermal status of a thermal chamber therein.

BACKGROUND

Chromatography is a set of techniques for separating a mixture into its constituents. For instance, in a liquid chromatography system, a pump takes in and delivers a mixture of liquid solvents to a sample manager, where an injected sample awaits its arrival. The mobile phase, comprised of a sample dissolved in a mixture of solvents, passes to a column, referred to as the stationary phase. By passing the mixture through the column, the various components in the sample separate from each other at different rates and thus elute from the column at different times. A detector receives the elution from the column and produces an output from which the identity and quantity of the analysis may be determined.

Prior to being provided into the liquid chromatography system, the sample may be provided to a sample organizer and/or a sample manager. The sample organizer and/or a sample manager may be configured to store the sample in conditions that prevent the sample from degrading or becoming otherwise damaged. The sample organizer and/or sample manager may be configured to provide the sample into the liquid chromatography system. The sample organizer and/or sample manager may be configured to store a plurality of samples prior to analysis by the liquid chromatography system.

Sample managers and/or sample organizers often include thermal chambers with the need of very accurate temperature control at temperatures at or close to freezing point of water. Temperature control may include incorporating a heat sink running at temperatures below 0° C. However, heat sinks running at such temperatures are known to condense liquid and eventually freeze. When ice has built up the performance of the engine controlling the temperature decreases and the temperature within the thermal chamber will undesirably rise. Furthermore, sometimes engines that control thermal chambers of these systems fail unexpectedly.

Thus, liquid chromatography thermal systems, or liquid chromatography sample managers and/or organizers, with associated systems and methods for detecting the status of thermal chambers therein, would be well received in the art.

SUMMARY

In one embodiment, a liquid chromatography system comprises: a solvent delivery system; a sample delivery system in fluidic communication with solvent delivery system; a liquid chromatography column located downstream from the solvent delivery system and the sample delivery system; a detector located downstream from the liquid chromatography column; a thermal chamber housing at least one of the solvent delivery system, the sample delivery system, the liquid chromatography column and the detector; an engine configured to control the temperature in the thermal chamber; a heatsink operably connected to the engine; a first temperature sensor within the thermal chamber; a second temperature sensor; a computer system configured to receive temperature information from each of the first and second temperature sensors, the computer system comprising: one or more processors; one or more memory devices coupled to the one or more processors; and one or more computer readable storage devices coupled to the one or more processors, wherein the one or more storage devices contain program code executable by the one or more processors via the one or more memory devices to implement a method for controlling temperature in the thermal chamber, the method comprising: receiving, by the computer system, a first temperature measurement from the first temperature sensor; receiving, by the computer system, a second temperature measurement from the second temperature sensor; receiving, by the computer system, power information related to power utilized by the engine; analyzing, by the one or more processors, the first and second temperature measurements and the power information; and determining, by the one or more processors, a status of the thermal chamber based on the analyzing the first and second temperature measurements and the power information.

In another embodiment, a method for determining a status of a thermal chamber in a liquid chromatography system comprises: receiving, by a computer system, a first temperature measurement from a first temperature sensor located in the thermal chamber; receiving, by the computer system, a second temperature measurement from a second temperature sensor; receiving, by the computer system, power information related to power utilized by an engine; analyzing, by one or more processors of the computer system, the first and second temperature measurements and the power information; determining, by the one or more processors, whether ice has formed on the heat sink based on the first and second temperature measurements and the power information; and determining, by the one or more processors, a status of the thermal chamber based on the analyzing the first and second temperature measurements and the power information.

In another embodiment, a liquid chromatography sample manager comprises: a sample delivery system configured to provide a sample to a liquid chromatography column located downstream from the sample delivery system; a thermal chamber housing the sample delivery system; an engine configured to control the temperature in the thermal chamber; a heatsink operably connected to the engine; a first temperature sensor within the thermal chamber; a second temperature sensor; a computer system configured to receive temperature information from each of the first and second temperature sensors, the computer system comprising: one or more processors; one or more memory devices coupled to the one or more processors; and one or more computer readable storage devices coupled to the one or more processors, wherein the one or more storage devices contain program code executable by the one or more processors via the one or more memory devices to implement a method for controlling temperature in the thermal chamber, the method comprising: receiving, by the computer system, a first temperature measurement from the first temperature sensor; receiving, by the computer system, a second temperature measurement from the second temperature sensor; receiving, by the computer system, power information related to power utilized by the engine; analyzing, by the one or more processors, the first and second temperature measurements and the power information; and determining, by the one or more processors, a status of the thermal chamber based on the analyzing the first and second temperature measurements and the power information.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 1:
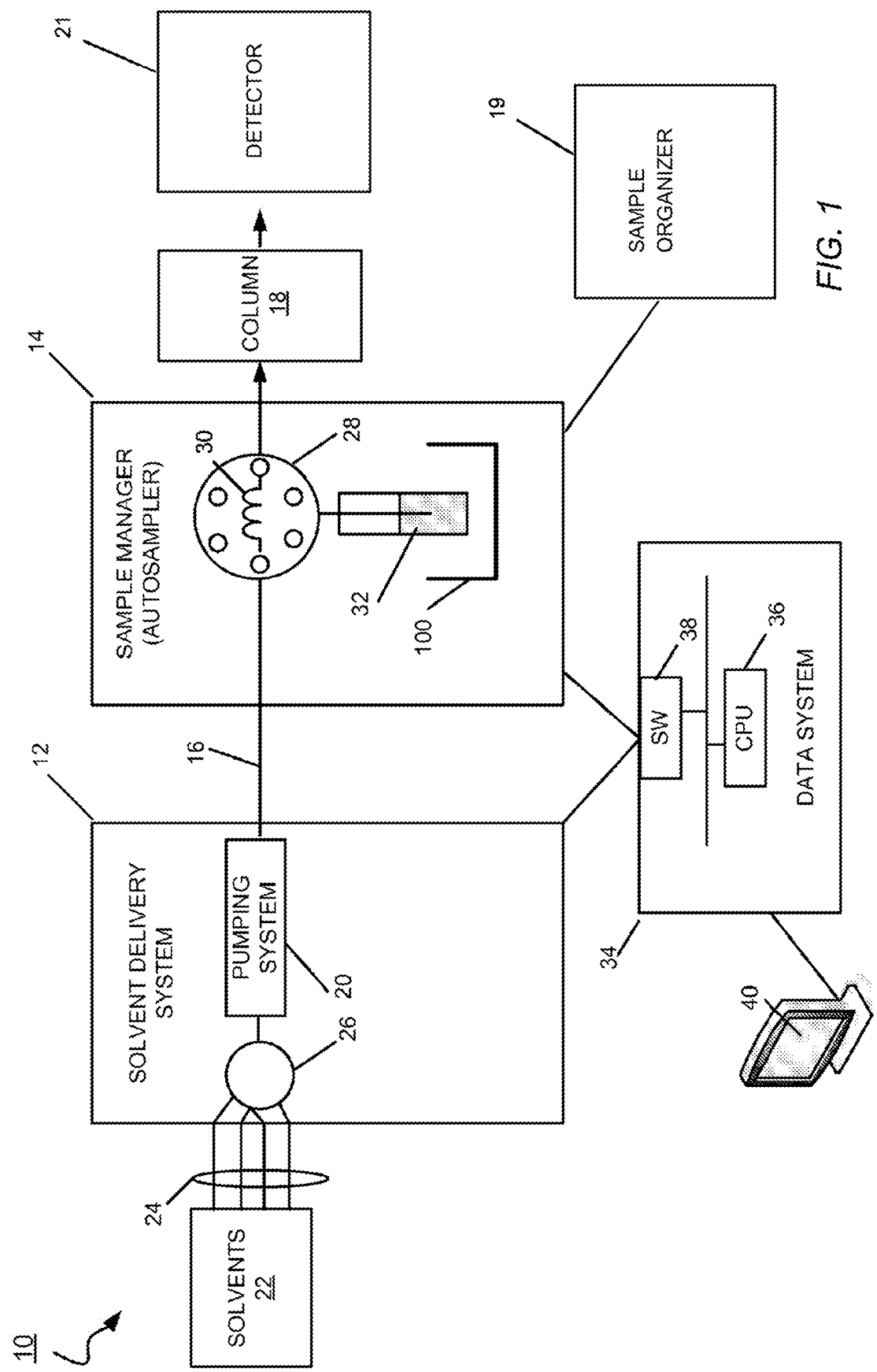
FIG. 1 depicts a schematic view of a liquid chromatography system including a sample manager and a sample organizer in accordance with one embodiment.

FIG. 1 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18 and in mechanical communication with a sample organizer 19. The sample organizer 19 may be configured to store samples and provide stored samples to the sample manager 14 using an automated, robotic, or other mechanical moving process. A detector 21 for example, a mass spectrometer, is in fluidic communication with the column 18 to receive the elution.

The solvent delivery system 12 includes a pumping system 20 in fluidic communication with solvent reservoirs 22 from which the pumping system 20 draws solvents (liquid) through tubing 24. In one embodiment, the pumping system 20 is embodied by a low-pressure mixing gradient pumping system having two pumps fluidically connected in series. In the low-pressure gradient pumping system, the mixing of solvents occurs before the pump, and the solvent delivery system 12 has a mixer 26 in fluidic communication with the solvent reservoirs 22 to receive various solvents in metered proportions. This mixing of solvents (mobile phase) composition that varies over time (i.e., the gradient).

The pumping system 20 is in fluidic communication with the mixer 26 to draw a continuous flow of gradient therefrom for delivery to the sample manager 14. Examples of solvent delivery systems that can be used to implement the solvent delivery system 12 include, but are not limited to, the ACQUITY Binary Solvent Manager and the ACQUITY Quaternary Solvent Manager, manufactured by Waters Corp. of Milford, Mass.

The sample manager 14 may include an injector valve 28 having a sample loop 30. The sample manager 14 may operate in one of two states: a load state and an injection state. In the load state, the position of the injector valve 28 is such that the sample manager loads the sample 32 into the sample loop 30. The sample 32 is drawn from a vial contained by a sample vial carrier or any device configured to carry a sample vial such as a well plate, sample vial carrier, or the like. In the injection state, the position of the injector valve 28 changes so that the sample manager 14 introduces the sample in the sample loop 30 into the continuously flowing mobile phase from the solvent delivery system. The mobile phase thus carries the sample into the column 18. In other embodiments, a flow through needle (FTN) may be utilized instead of a Fixed-Loop sample manager. Using an FTN approach, the sample may be pulled into the needle and then the needle may be moved into a seal. The valve may then be switched to make the needle in-line with the solvent delivery system.

The liquid chromatography system 10 further includes a data system 34 that is in signal communication with the solvent delivery system 12, the sample manager 14 and/or the sample organizer 19. The data system 34 may include a processor 36 and a switch 38 (e.g. an Ethernet switch) for handling signal communication between the solvent delivery system 12, the sample manager 14, and the sample organizer 19, and otherwise controlling these components of the liquid chromatography system 10, as described herein. In other embodiments, the data system 34 may further control various other components of the system, such as the detector 21, etc. Signal communication among the various systems and instruments can be electrical or optical, using wireless or wired transmission. A host computing system 40 is in communication with the data system 34 by which a technician can download various parameters and profiles (e.g., an intake velocity profile) to the data system 34. The data system 34 may be a single data system or a plurality of data systems controlling the various components of the liquid chromatography system 10. The data system 34 may be an external system to each of the various other components of the liquid chromatography system 10. Alternatively, one or more data systems 34 may be located in one or more of each of the other components of the liquid chromatography system 10. The data system 34 may be configured to control the temperature within the operating compartments of the sample manager 14 and the sample organizer 19, as described herein below. Further, the data system 34 may be configured to predict the status of the operating compartments of the sample manager 14, such as by predicting when a heatsink in the operating compartment has ice and is needing defrost, or such as by predicting when a temperature controlling engine that is maintaining the temperature of the operating compartment is likely to fail.

Figure 2:
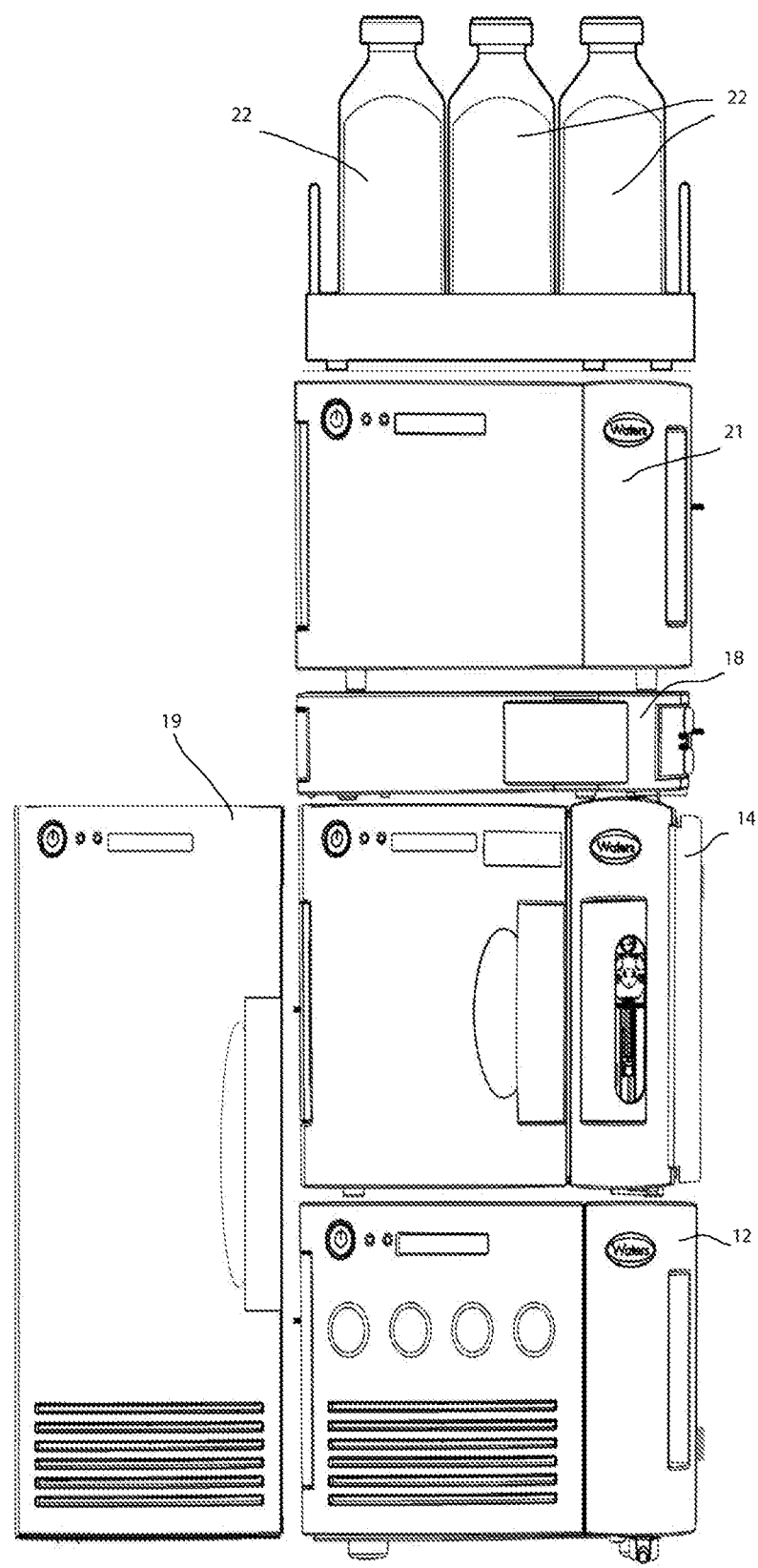
FIG. 2 depicts a perspective view of a liquid chromatography system including the sample manager and the sample organizer of FIG. 1 in accordance with one embodiment.

FIG. 2 shows a perspective view of the liquid chromatography system 10 including the sample manager 14, the sample organizer 19, the detector 21, the chromatographic column 18, the solvent delivery system 12, and the solvents 22. Each of the sample manager 14, the sample organizer 19, the detector 21, the chromatographic column 18, the solvent delivery system 12 may include a housing or body within which the various features may be housed, such as the data system 34, the sample loop 30 and injector valve 28, the pumping system 20, the mixer 26 and the tubing 24. The various components 12, 14, 18, 19, 21, 22 may be interconnected with fluidic tubes and in signal communication to the data system 34 of the system. The liquid chromatography system 10 is shown with the solvent delivery system 12, sample manager 14, chromatographic column 18, detector 21 and a tray for holding the solvents 22 stacked together and positioned adjacent, proximate or next to the sample organizer 19. The sample manager 14 and the sample organizer 19 may be connected to each other via an opening in each of the sample manager 14 and an opening in the sample organizer 19, so that samples can be transferred there through between the sample manager 14 and the sample organizer 19.

The sample organizer 19 may include a hinged door and includes an inner storage chamber or thermal chamber which may include a plurality of sample organizer shelves disposed or movably mounted within the inner storage chamber. The plurality of shelves may be located at a front of the sample organizer 19 proximate the hinged door. The plurality of sample organizer shelves may be movable to selectively align the plurality of sample organizer shelves within the sample manager 14 and a transfer system may be provided between the sample manager 14 and the sample organizer 19 that is configured to transfer samples between the sample manager 14 and the sample organizer 19. The sample organizer 19 and the sample manager 14 may be configured to keep inner storage chamber in a temperature regulated state, as described herein below.

Figure 3:
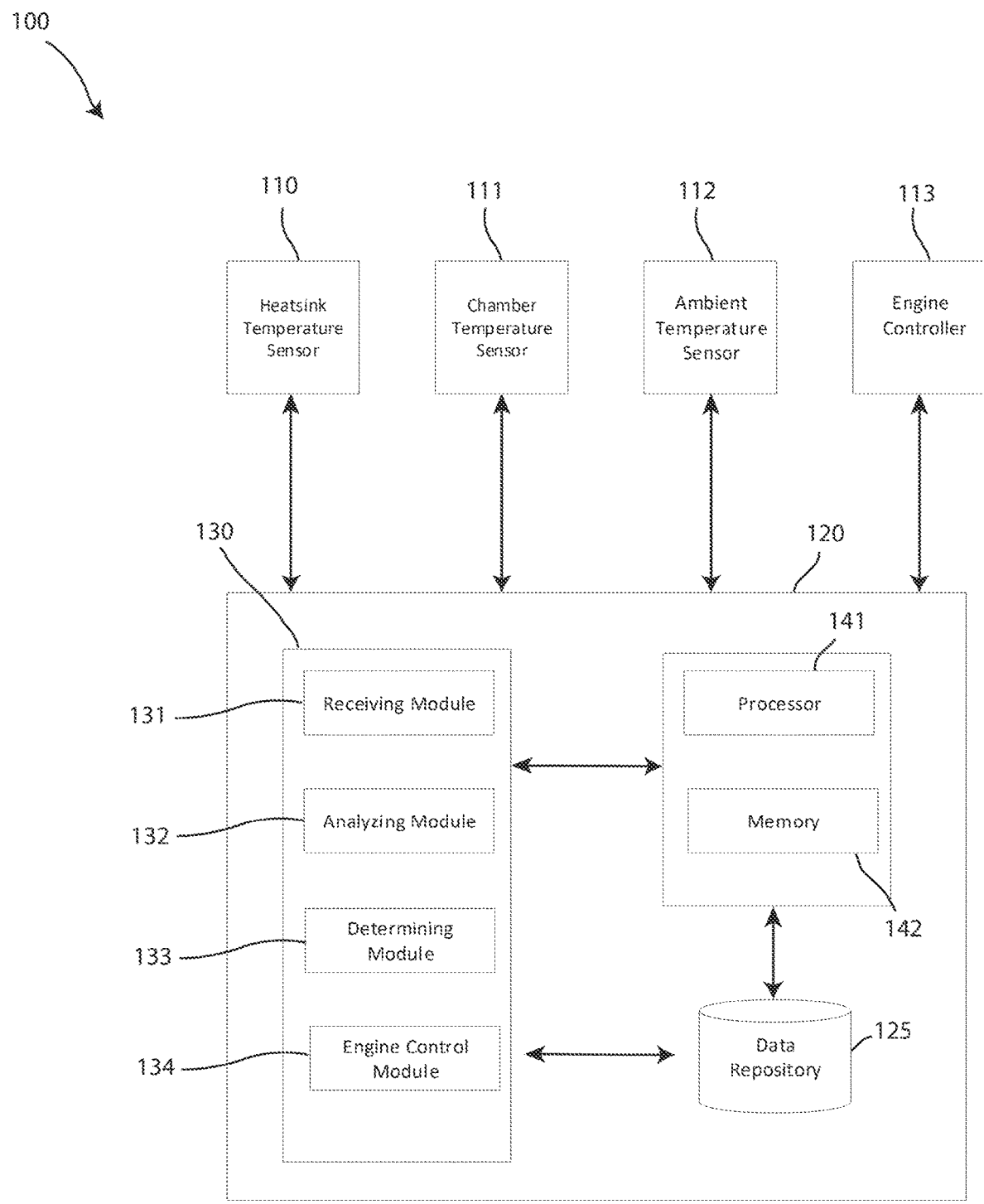
FIG. 3 depicts a schematic view of a liquid chromatography thermal system, such as the sample manager or sample organizer if FIG. 1, in accordance with one embodiment.

FIG. 3 depicts a schematic view of a liquid chromatography thermal system 100, such as the sample manager 14 or the sample organizer 19, for example including the data system 34 of FIG. 1, in accordance with one embodiment. The liquid chromatography thermal system 100 may be a thermoelectric cooling system, Peltier device, Peltier heat pump, or solid state refrigerator. The liquid chromatography thermal system 100 may include a heat sink temperature sensor 110 configured to sense the temperature of a heat sink 114, a chamber temperature sensor 111 configured to sense the temperature of a thermal chamber 115, an ambient temperature sensor 112, and an engine controller 113 configured to provide an output that indicates, corresponds, monitors or otherwise provides the power-level of a thermal engine 116. The sensors 110, 111, 112, and the engine controller 113 are shown communicatively coupled to a computer system 120. This connection may either be direct or over a network (wired or wireless).

In other embodiments, additional sensors besides the sensors 110, 111, 112 may be employed. For example, contemplated embodiments include two separate heatsink temperature sensors, described in more detail hereinbelow with respect to the method of FIG. 8. These embodiments may include a first heat sink temperature sensor located on a first side of a heat sink, and a second heat sink temperature sensor located on a second side of the heat sink that is opposite the first side. The first side of the heat sink may be an intake side and the second side may be an exhaust side. The first heat sink temperature sensor may be located on a compartment side of the heat sink while the second heat sink temperature sensor may be located outside of the compartment on an exhaust side. The first and second heat sink temperatures may be configured to provide temperature information to the computer system 120 that allows for the computer system to analyze the received information and predict detect engine failure, as described hereinbelow and shown in FIG. 8. In embodiments configured to utilize two heat sink temperature sensors to detect engine failure, there may not be a need for other temperature sensors, such as the chamber temperature sensor 111 and the ambient temperature sensor 112. However, these additional temperature sensors 111, 112 may be utilized in a combined system that may predict both engine failure and detect frost on the heat sink. Various embodiments are contemplated that include any combination of the temperature sensors described herein.

The engine controller 113 may include one or more proportional integral derivative controllers (PID controller). The PID controller may provide an output to the thermal engine 113 to control engine power level. The PID controller may further provide an output to the computer system 120 that may utilized to calculate engine power. The PID controller may be an open loop control that is configured to calculate how the thermal engine 113 is driven and further provides information to the computer system 120 for the performance of the calculations disclosed herein. The engine controller 113 and/or the PID controller may further include a pulse-width modulation control to limit the thermal engine 113 as necessary. In still other embodiments, the engine controller 113 may include any form of engine power sensor that may be utilized by the liquid chromatography system 100 in order to provide engine power information to the computer system 120 necessary to perform the calculations described herein.

As described above, the computer system 120 may be one or more data systems that are located external to either or both of the sample manager 14 and sample organizer 19. The computer system 120 may alternatively be a system that is self-contained within a thermal chamber device such as the sample manager 14 and sample organizer 19.

The thermal chamber 115 may be a thermal chamber located within the sample manager 14 and/or the sample organizer 19. In one embodiment, the thermal chamber 115 may be a chamber that comprises the collective chambers within both of the sample manager 14 and the sample organizer 19. The thermal chamber 115 may be any chamber that is an element of a liquid chromatography system.

The engine 116 may be a device configured to provide the power necessary to cool the thermal chamber 115 with the heat sink. Hereinafter, an "engine" may refer to any cooling system, engine, Peltier cooler, thermoelectric cooler, heat pump, or other power outputting device for creating a temperature difference by transferring heat between two electrical junctions. The engine 116 may be configured to apply a voltage across joined conductors to create an electrical current. The engine 116 may be connected to the computer system 120 such that the computer system is configured to sense or otherwise monitor the power being output by the engine 116. The engine 116 may be at least partially located within the thermal chamber 115 in one embodiment such that the cool side having the heat sink 114 may be located within the chamber 115 and the warm conductor may be exposed to the ambient environment outside the thermal chamber 115.

The heatsink 114 may be located within the thermal chamber 115. The heat sink 114 may be one or more passive heat exchangers that are configured to absorb heat from the thermal chamber 115. The heat sink 114 may be a cooling plate. The heat sink 114 may be made from an aluminum alloy, copper, or other metallic material. The heat sink 114 may be a flat plate or may include fins of various arrangements, or other fin-like structure, to facilitate heat transfer.

Each of the heat sink temperature sensors 110, the chamber temperature sensors 111 and the ambient temperature sensor 112 may be, for example, an electrical temperature sensing device such as a thermocouple, thermistor, resistance thermometer, or silicon bandgap temperature sensor. The temperature sensors 110, 111, 112 may each be a single temperature sensor, in one embodiment. Alternatively, the temperature sensors 110, 111, 112 may each be a plurality of temperature sensors, in other embodiments, that combine to sense the temperature of one or more given elements. For example, the heat sink temperature sensor 110 may comprise one or more temperature sensors configured to sense the temperature of one or more heat sinks in the thermal system 100. Similarly, the chamber temperature sensor 111 may comprise one or more temperature sensors configured to sense the temperature of the chamber 115 that is being temperature controlled by the engine 116 and the heat sink 114. The ambient temperature sensor 112 may comprise one or more temperature sensors configured to sense the temperature of the ambient environment located outside the thermal chamber 115, the sample manager 14 and/or the sample organizer 19.

Embodiments of the computer system 120 may include a module system 130 including a receiving module 131, an analyzing module 132, a determining module 133, and an engine control module 134. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 may include one or more components of hardware and/or software program code for receiving temperature measurements which may include information, data, and/or other communications related to sensed temperatures coming from each of the heatsink temperature sensor(s) 110, the chamber temperature sensor(s) 111 and the ambient temperature sensor(s) 112. The receiving module 131 may further be configured to receive the power level information and/or measurements, which may include information, data and/or other communications related to or otherwise quantifying the power percentage of the engine 116. For example, the power information may be an amount of power being consumed by the engine 116 over time. The power information may further relate to the voltage and/or current being output by the engine 116 into the thermoelectric cooling system and the heat sink 114. The receiving module 131 may be configured to receive this power and temperature measurement information that is being provided constantly or continuously over time. In some embodiments, the receiving module 131 may be configured to receive this power and temperature measurement information at periodic intervals as the sensors 110, 111, 112 and engine controller 113 sense respective conditions at the periodic intervals. The information and data received by the receiving modules 110, 111, 112 and engine controller 113 may be stored by the receiving module 131 in the data repository 125, in some embodiments, for use by the other modules 132, 133, 134 in the processes described herein. In other embodiments, the information received may be immediately processed by the processor 141 and may be stored in the memory 142 during such processing.

Embodiments of the analyzing module 132 may include one or more components of hardware and/or software program code configured to analyze the temperature measurements provided by the heatsink temperature sensor(s) 110, the chamber temperature sensor(s) 111 and the ambient temperature sensor(s) 112, along with the engine power level information or measurements provided by the engine controller 113. The analyzing module 132 may include processing this information with one or more algorithms for analyzing the efficiency of the thermal engine 116 from the various temperature information received along with the power output information received. The analyzing module 132 may be configured to continually characterize the thermal efficiency of the engine 116.

Referring still to FIG. 3, embodiments of the computer system 120 may further include the determining module 133. Embodiments of the determining module 133 may refer to configurations of hardware, software program code, or combinations of hardware and software programs, capable of determining the efficiency of the engine 116 or otherwise characterizing the engine 116 to determine when ice has formed on the heatsink 114. The determining module 133 may thus utilize the analysis performed by the analyzing module 132 of the information received by the receiving module 131 from the sensors 110, 111, 112 and engine controller 113 to determine whether ice has formed on the heat sink 114. This determining may be continuous, in some embodiments. In others, the determining may be performed at periodic intervals using measurements taken from the sensors 110, 111, 112 and engine controller 113 at periodic intervals. In some embodiments, the determining may be based on the information provided by the engine controller 113, the heatsink temperature sensor 110 and the chamber temperature sensor 111. In other embodiments, this information may further include the ambient temperature sensor 112 that is located outside the thermal chamber 115.

The determining module 133 may further be configured to determine a start temperature of the thermal compartment 115 for the purposes of running a defrost algorithm. The determining module 133 may further be configured to determine a start temperature of the heat sink 114 for the purposes of running a defrost algorithm. The determining module 133 may further be configured to determine whether or not a change in temperature between the start temperature of the compartment 115 and the current temperature of the compartment 115 is greater than a predetermined threshold temperature change.

Embodiments of the determining module 133 may be configured to analyze and determine or predict a status within the thermal compartment 115. For example, as described above, the determining module 133 may be configured to determine a frost status on a heat sink 114 within the thermal compartment 115. In other embodiments, the determining module 133 may be configured to predict or otherwise determine that an engine 116 of the thermal system 100 is currently failing, or likely to fail. For example, the determining module 133 may be configured to receive temperature information from each of two temperature sensors located on opposite sides of a heat sink, along with power information from an engine power sensor. The determining module 133 may utilize this information to detect or otherwise determine that an engine is not working efficiently to maintain the temperature of the heat sink and utilize one or more algorithms that correlate this determination to the status of an engine. To determine the status of the engine, the determining module 133 may be configured to characterize the engine by measuring the change in temperature between the two side of the heat sink and relate it to the power level of the engine. Then over the life of the instrument, the determining module 133 may be configured to monitor the change in temperature and power level and correlate it to a baseline efficiency known for the system. If the change in temperature begins to deviate significantly from the instrument's characterization level, the determination module 133 may be configured to flag that the user the efficiency has changed. The determining module 133 may be configured to then provide a warning indicator of engine failure detection to a user. In some embodiments, the determining module 133 may be configured to provide a user interface with an engine life or engine usage scale. For example, the determining module 133 may be configured to provide a percentage scale from 0-100% that represents the life of the engine used or remaining.

With continued reference to FIG. 3, embodiments of the computer system 120 may include the engine control module 134. Embodiments of the engine control module 134 may include one or more components of hardware and/or software program code for controlling the engine 116 of the liquid chromatography thermal system 100. The engine control module 134 may be configured to operate a defrost process on the heat sink 114 when the determining module 133 has determined that ice has formed on the heat sink 114. The engine control module 134 may be configured to increase a temperature setpoint of the heatsink 114 by a predetermined number of degrees and controlling the engine 116 by reducing and/or eliminating the power generated by the engine 116 to cool the heatsink 114, in order to thereby achieve this higher temperature setpoint of the heatsink 114. The analyzing, determining and engine control modules 132, 133, 134 may be configured to wait a predetermined period of time after the setpoint of the heatsink has been increased to the temperature of the compartment 115 before checking to see if the compartment temperature has increased. If it is determined that the temperature of the compartment 115 has not increased, the modules 132, 133, 134 may be configured to wait another predetermined time period before once again checking to see whether the compartment temperature has increased by the threshold amount. Once it is determined by the determining module 133 that the compartment temperature has increased past a threshold amount, the engine control module 134 may be configured to increase power to the engine 116 back to the normal operating mode of the engine.

Referring still to FIG. 3, embodiments of the computer system 120 may be equipped with a memory device 142 which may store the location information, information related to the information and datasets being processed using decision tree analysis as described herein, and a processor 141 for implementing the tasks associated with the liquid chromatography thermal system 100.

Figure 4:
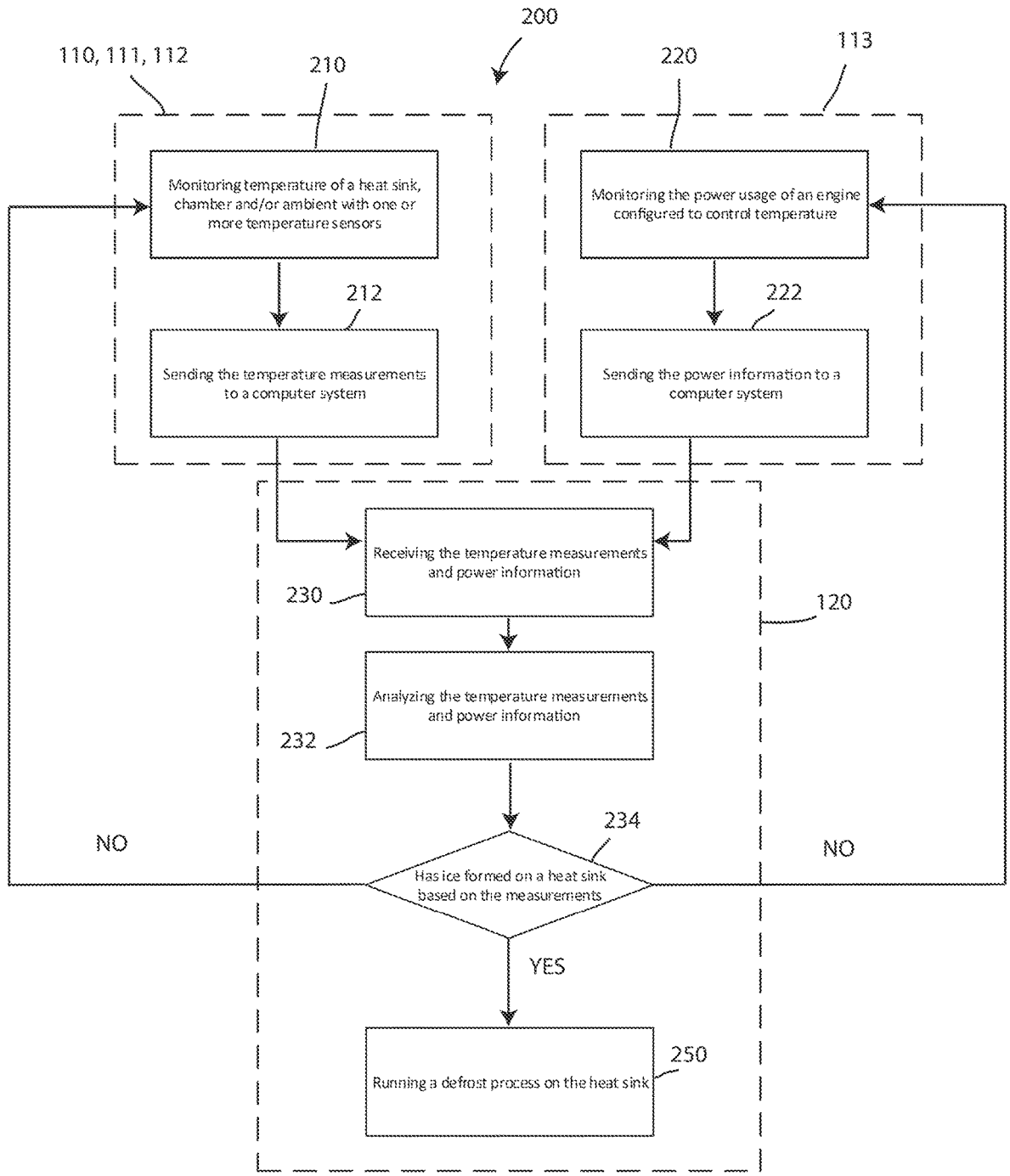
FIG. 4 depicts a flow chart of a method for determining a status of a thermal chamber in a liquid chromatography thermal system, such as the liquid chromatography thermal system of FIG. 3, in accordance with one embodiment.

Referring now to FIG. 4, a flow chart of a method for determining a status of a thermal chamber in a liquid chromatography thermal system 200, such as the liquid chromatography thermal system 100 of FIG. 3, is shown in accordance with one embodiment. The method 200 may include a step 210 of monitoring temperature of a heat sink such as the heat sink 114, a thermal chamber such as the thermal chamber 115 and/or an ambient temperature outside the thermal chamber, such as by temperature sensors such as the sensors 110, 111, 112. The method may further include a step 212 of sending these temperature measurements by the sensors 110, 111, 112 to the computer system 120, for example. The method 200 may include another step 220 of monitoring the power use of an engine, such as the engine 116, by a power sensing device such as the engine controller 113 or other engine diagnostic means. The method 200 may include a step 222 of sending power information to the computer system. The method steps 210 and 212 may be occurring simultaneous to the method steps 220, 222 in one embodiment.

The method 200 may include a step 230 of receiving the temperature measurements and the power information generated or taken by the sensors from the steps 210, 212, 220, 222, by the computer system, by for example the receiving module 131. The method 200 may include a next step 232 of analyzing, by for example the analyzing module 132 of the computer system, the temperature measurements, information, data or the like that is received. The method 200 may include a next step 234 of determining a status, such as whether ice has formed on a heat sink of the system, such as the heat sink 114. The step 234 may be conducted by a module such as the determining module 133. If step 234 determines that ice has not formed on the heat sink, the method 200 may include returning to steps 210, 220 of the method 200. If step 234 determines that ice has formed on the heat sink, the method 200 may include one or more steps 250 of running a defrost process in order to defrost the heat sink.

Figure 5:
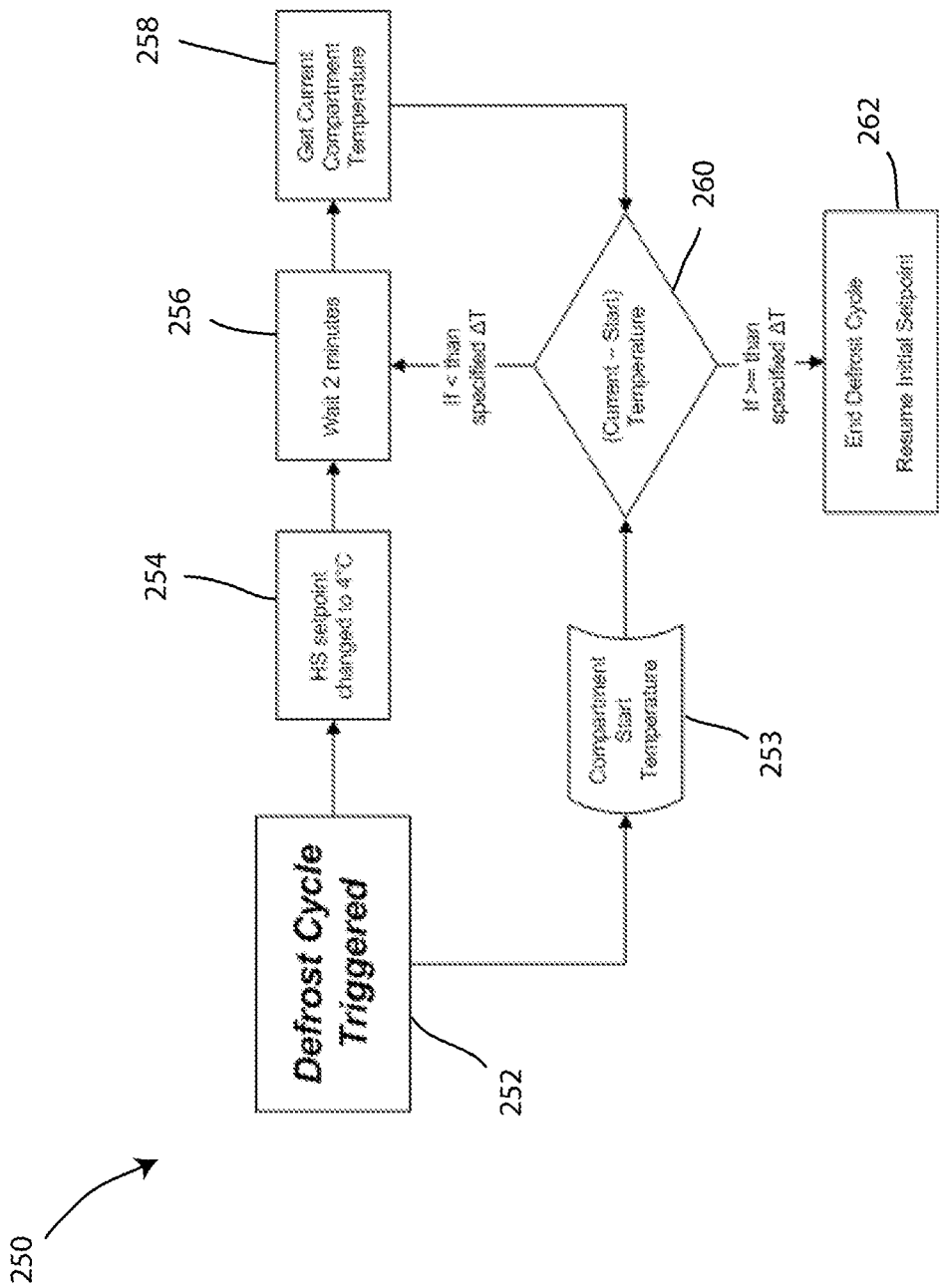
FIG. 5 depicts a flow chart of another method for determining a status of a thermal chamber in a liquid chromatography thermal system, such as the liquid chromatography thermal system of FIG. 3, in accordance with one embodiment.

FIG. 5 depicts an expanded form of step 250 of the method 200, which includes the steps for a defrost method for defrosting ice from a heat sink in a liquid chromatography thermal system, such as the liquid chromatography thermal system 100 of FIG. 3, in accordance with one embodiment. A first step in the defrost method 250 may include a step 252 of triggering a defrost cycle, which may occur if it has been determined, in method 200, that ice has formed on the heat sink. Upon triggering the defrost method at step 252, the method 250 may include a step 253 of measuring and providing a compartment start temperature, such as the temperature of the compartment 115 at the start of the defrost method 250. This may be provided to a memory storage location, such as the memory 142 of the data repository 125. The defrost method 250 may also include a step 254 of changing a setpoint of a heatsink, such as the heatsink 114, to a higher temperature. The higher temperature setpoint may be a temperature that is above the freezing point of water, such as above 0° C. In one embodiment, the temperature setpoint may be between 2° C. and 6° C. In another embodiment, the temperature setpoint may be at or around 4° C. The defrost method 250 may further include reducing the power output by the engine 116 by the engine control module 134 to increase the temperature of the heat sink 114 to increase to slowly increase the temperature of the heatsink 114 and/or remove the ice thereon.

The defrost method 250 may include a next step 256 of waiting a predetermined amount of time with the higher heatsink temperature threshold. The predetermined amount of time may be a number of minutes, for example between 1-5 minutes. In other embodiments, the predetermined amount of time may be 1-3 minutes. In other embodiments, the predetermined amount of time may be at or about 2 minutes. Still further embodiments, a predetermined number of seconds may be waited such as 30 seconds, 40 seconds, 90 seconds or the like. The predetermined amount of time may be dependent on the current compartment start temperature, in one embodiment. For example, a lower compartment start temperature may have a longer predetermined wait time. The defrost method 250 may include a next step 258 of determining the current compartment temperature, by measuring the temperature of the compartment from the chamber temperature sensor 111 and providing the measurement to the computer system. The defrost method 250 may further include determining whether the change in temperature between the compartment start temperature and the current compartment temperature is greater than a threshold temperature change. The threshold temperature change may be, for example, between 0.5° C. and 1.2° C. In one embodiment, the threshold temperature change may be a function of the initial heatsink setpoint temperature. For example, if the initial heatsink setpoint temperature is set to a higher setpoint, threshold temperature change may be larger.

In one embodiment, the defrost cycle begins and the temperature of the heatsink may be set to 4° C. The threshold temperature change may be set to 0.8° C. The initial chamber temperature may be measured at 2° C. After two minutes waiting from the initiation of the defrost method, the temperature in the chamber is measured again, and has risen to 2.5° C. The cycle continues for another two minutes, after which point the measurement of the chamber is taken at 3° C. Here the temperature has now increased greater than the 0.8° C. defined by the threshold temperature change. Thus, the defrost cycle may end at an end step 262. The end step 262 may end the defrost method 250 but revert back to the method 200 that includes monitoring the temperatures to determine if the heat sink becomes frozen once again. If the temperature instead had again not increased the full 0.8° C., the defrost method 250 may revert back to the waiting step 256 for waiting another two minutes.

Figure 6A:
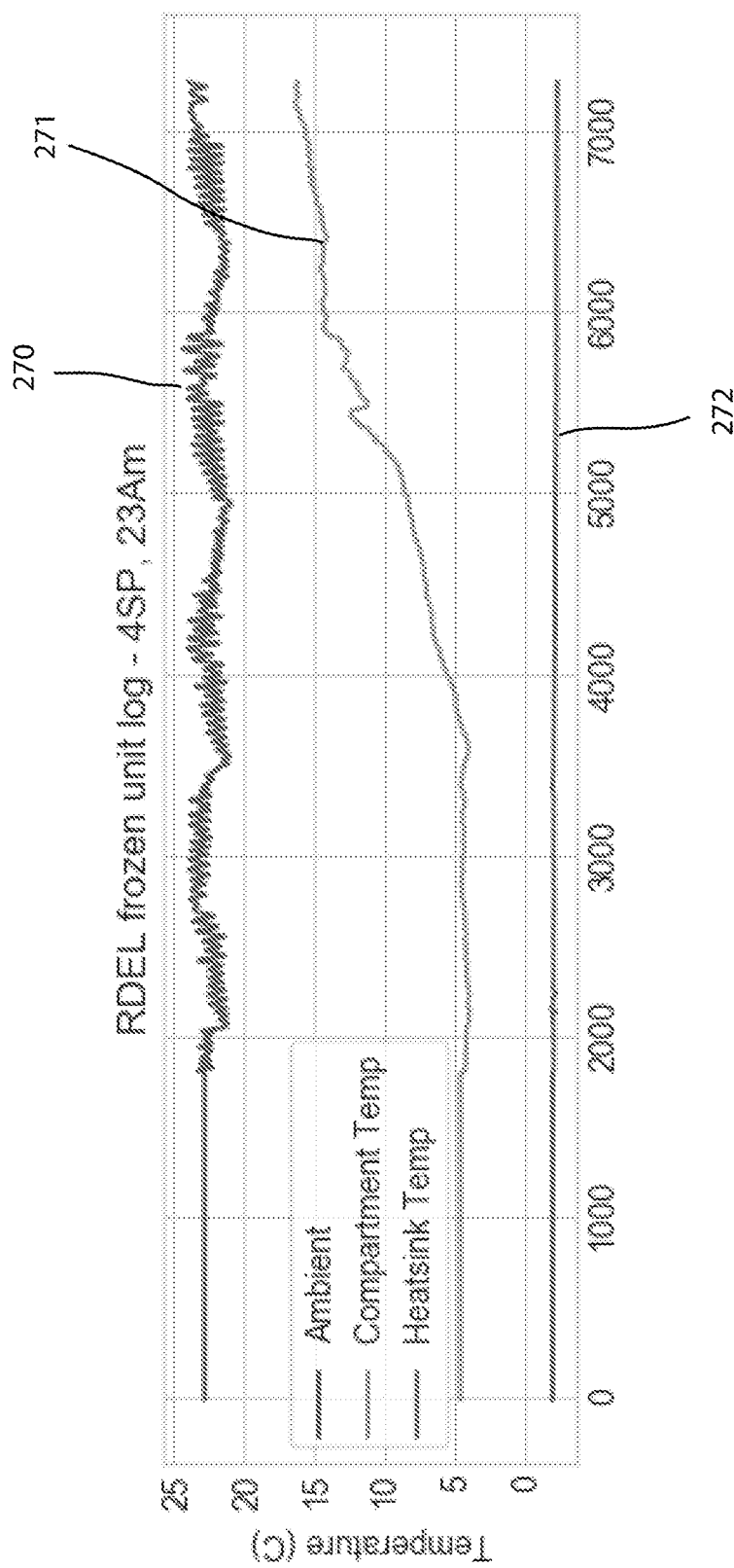
FIG. 6A depicts a first exemplary graph plotting temperatures over a first time period taken by three different sensors in a liquid chromatography thermal system, such as the liquid chromatography thermal system of FIG. 3, in accordance with one embodiment.

FIG. 6A depicts a first exemplary graph plotting temperatures over a first time period taken by three different sensors in a liquid chromatography thermal system, such as the liquid chromatography system 100 of FIG. 3, in accordance with one embodiment. The graph is shown including an ambient temperature plot 270, a compartment temperature plot 271, and a heatsink temperature plot 272. The graphs shown in FIGS. 6A-7C may be provided on a screen of a user interface, such as that of the host computing system 40, during operation of the liquid chromatography thermal system. The graphs 6A-6C shows exemplary measurements taken from sensors 110, 111, 112 and engine controller 113 in an exemplary thermal system. The exemplary graph corresponds to a compartment temperature set to 4° C. with an ambient condition held at 23° C.

Beginning at 1800 minutes, the sensors begin to provide the temperature information to the system, or the system becomes initiated. Prior to at or about the 1800 minute mark, the lines remain flat because the system may be off, not collecting data, or otherwise not performing the method 200 described hereinabove. Alternatively, the system may be very steady and at equilibrium during the time prior to the 1800 minutes mark. At or about the 1800 minutes mark, system may be turned on. The graph displays the ambient temperature plot 270 remaining relatively consistent over time at roughly 21-24° C. However, starting at or about the 3600 minutes mark, the chamber temperature begins to increase consistently, from at or about 5° C. to at or about 16° C., as shown by the chamber temperature plot 271. The heat sink temperature plot 272 also remains relatively consistent at −2.5° C. throughout the entirety of the graph.

Figure 6B:
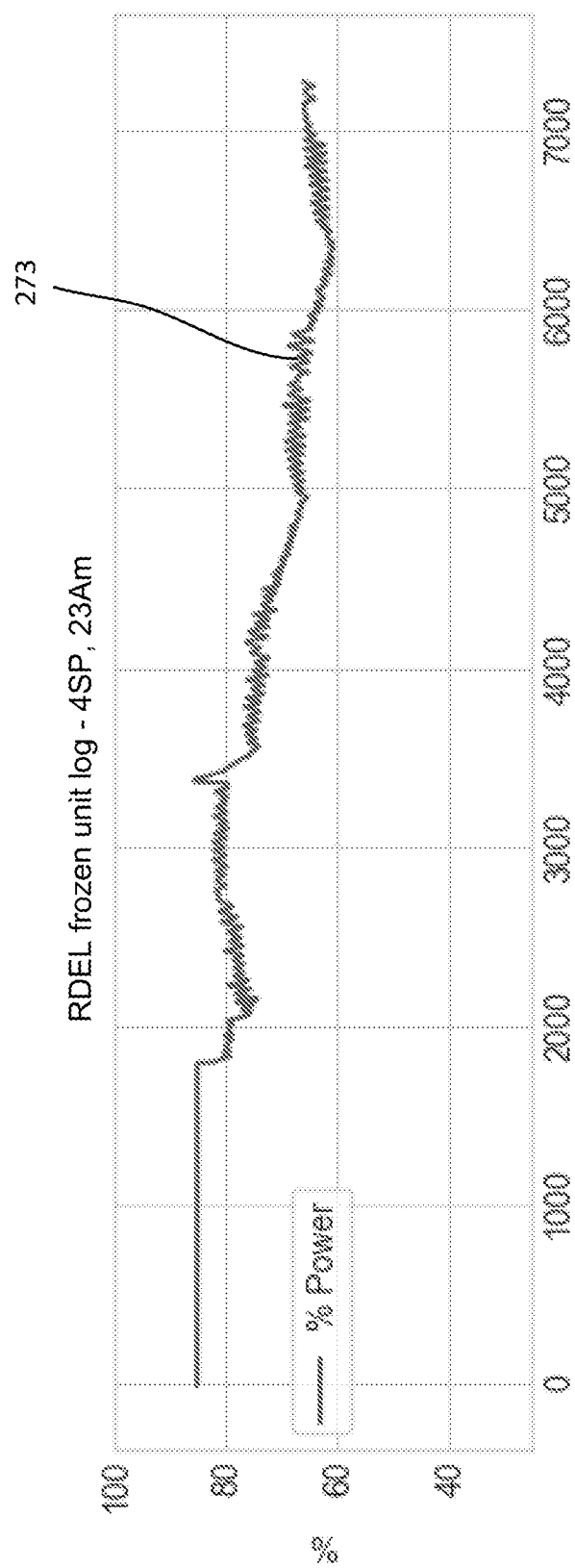
FIG. 6B depicts a second exemplary graph plotting engine power percentage over the first time period in a liquid chromatography thermal system, such as the liquid chromatography thermal system of FIG. 3, in accordance with one embodiment.

FIG. 6B depicts a second exemplary graph plotting engine power percentage over the first time period in a liquid chromatography thermal system, such as the liquid chromatography thermal system 100 of FIG. 3, in accordance with one embodiment. The graph shows an engine power percentage plot 273 over the same period of time as the graph of FIG. 6A. The engine power percentage plot 273 begins to decrease at or about the 3500 minutes mark, at a similar point in time as the chamber temperature begins to increase. Here, the engine power percentage plot 273 continues to drop over time until at or about the 6200 minute mark. The engine power percentage plot 273 is shown beginning at or about 80%, but then drops to 60% at or about the 6200 minute mark.

Figure 6C:
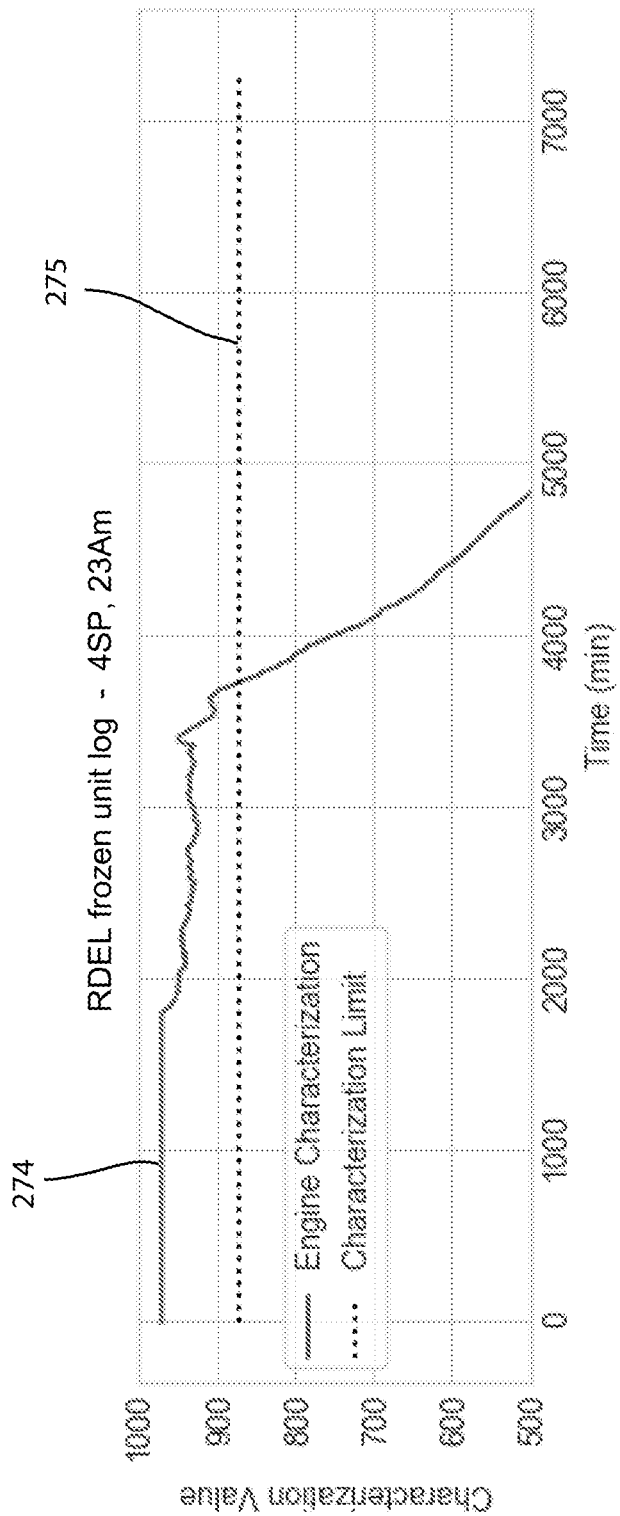
FIG. 6C depicts a third exemplary graph of engine characterization over the first time period in a liquid chromatography thermal system, such as the liquid chromatography thermal system of FIG. 3, in accordance with one embodiment.

FIG. 6C depicts a third exemplary graph of engine characterization over the first time period in a liquid chromatography thermal system, such as the liquid chromatography thermal system 100 of FIG. 3, in accordance with one embodiment. The graph of FIG. 6C shows an engine characterization plot 274 over time, along with a constant characterization limit 275. The characterization limit of the engine may be defined as calculated heat transfer rate between the compartment and exhaust sides of the engine during steady state operation. The equation utilized to calculate the characterization limit may be:

$$(((HS-A*Power)-Amb)*B)/(Cmpt-HS)$$

where HS, Amb, and Cmpt are the temperature readings from the heatsink, ambient and compartment temperature sensors 110, 111, 112, respectively, Power is the power level the engine is running found using power information provided by the engine controller 113, and A and B are coefficients that are determined by the material properties of the Peltier devices and heatsinks used. The temperature information provided by the heatsink, ambient and compartment temperature sensors 110, 111, 112 may be filtered to avoid false triggers due to noise.

The engine characterization plot 274 may be a characterization of the efficiency of the engine, how efficiently heat can be transferred between the compartment and exhaust heatsinks, determined by the temperature and power information provided to the system by the sensors 110, 111, 112 and engine controller 113. As shown, the engine characterization plot 274 actually begins to drop at or about the 3500 point. As shown, a threshold characterization limit 275 may exist of at or about 880. The engine characterization plot 274 is shown dropping below this characterization limit 275 at or about the 3700 minute mark. This may immediately trigger the defrost method 250, as described hereinabove.

Figure 7A:
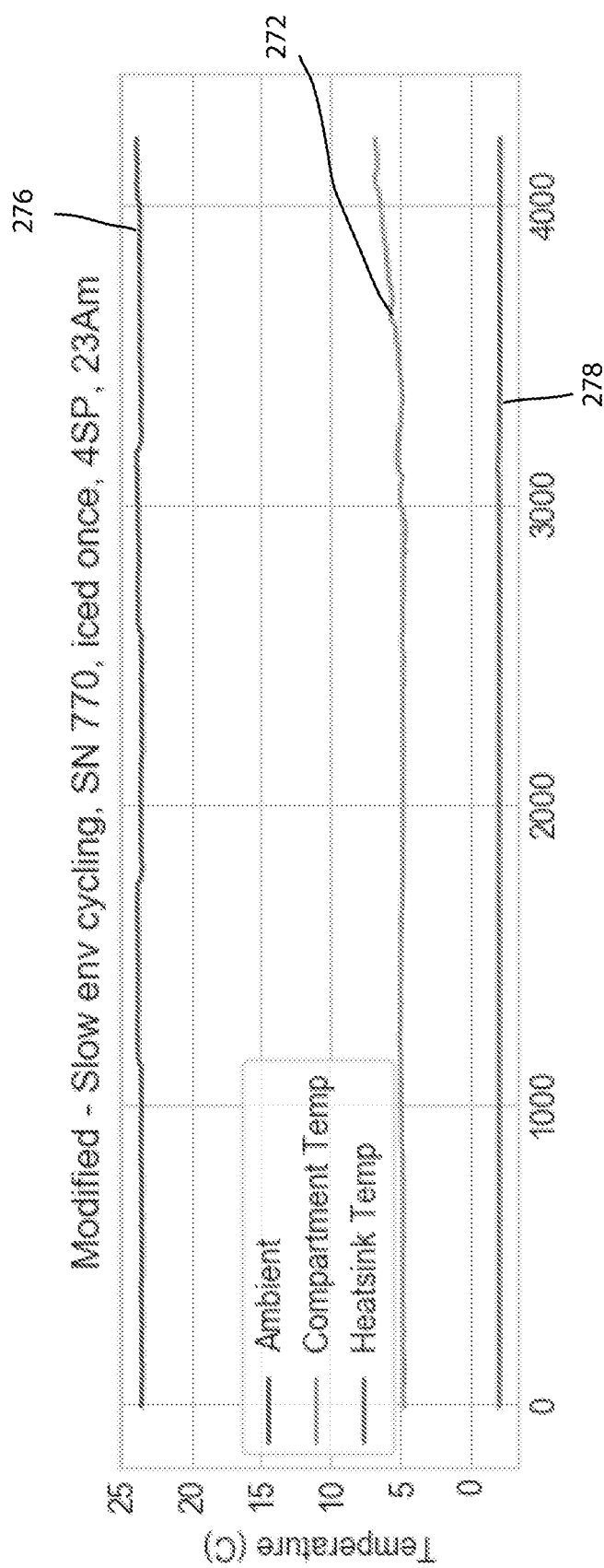
FIG. 7A depicts a first exemplary graph plotting temperatures over a second time period taken by three different sensors in a liquid chromatography thermal system, such as the liquid chromatography thermal system of FIG. 3, in accordance with one embodiment.

In another embodiment, FIG. 7A depicts a first exemplary graph plotting temperatures over a second time period taken by three different sensors in a different liquid chromatography thermal system than that shown in FIGS. 6A-6C, in accordance with one embodiment. The graph is shown including an ambient temperature plot 276, a compartment temperature plot 277, and a heatsink temperature plot 278. The graphs 7A-7C shows exemplary measurements taken from sensors 110, 111, 112 and engine controller 113 in an exemplary thermal system. The exemplary graph corresponds to a compartment temperature set to 4° C. with an ambient condition held at 23° C.

Beginning at 1200 minutes, the sensors begin to provide the temperature information to the system, or the system becomes initiated. Prior to at or about the 1200 minutes mark, the system is shown at a steady and equilibrium state. The graph displays the ambient temperature plot 276 remaining relatively consistent over time at roughly 24° C. However, starting at or about the 3100 minute mark, the chamber temperature begins to increase consistently, from at or about 5° C. to at or about 7° C., as shown by the chamber temperature plot 277. The heat sink temperature plot 278 also remains relatively consistent at −2.5° C. throughout the entirety of the graph.

Figure 7B:
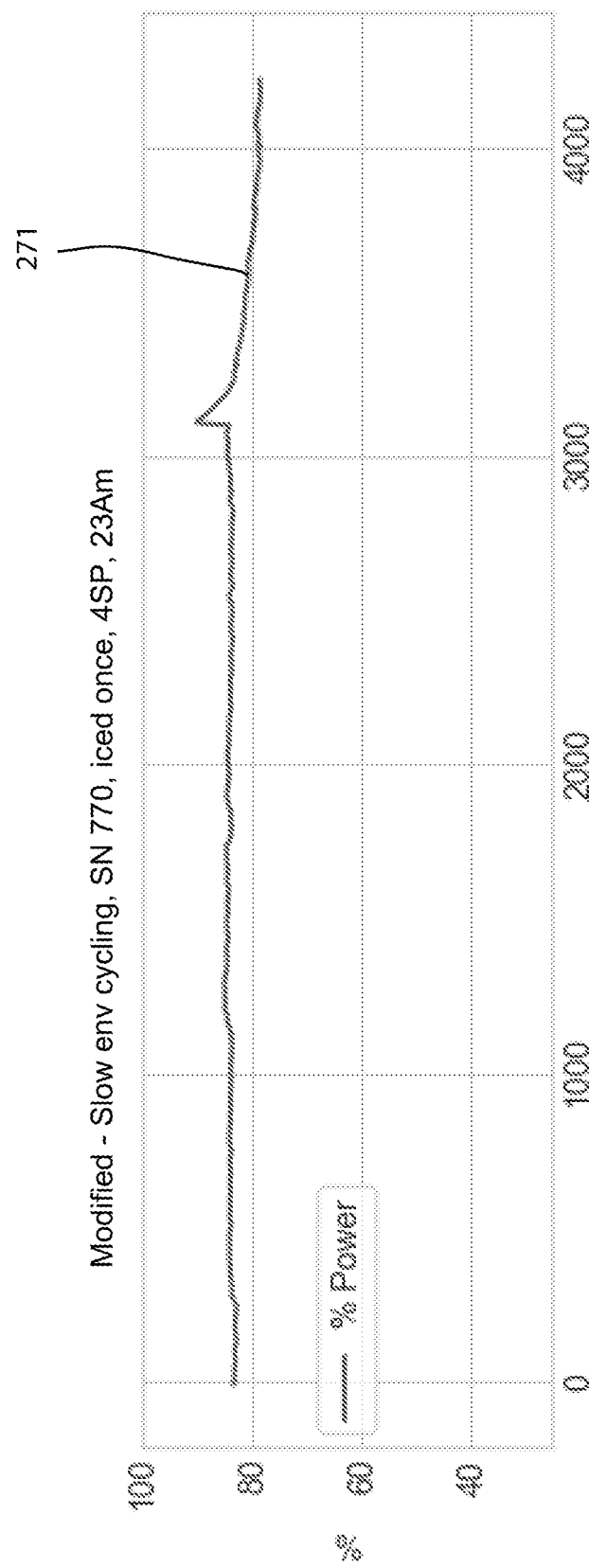
FIG. 7B depicts a second exemplary graph plotting engine power percentage over the second time period in a liquid chromatography thermal system, such as the liquid chromatography thermal system of FIG. 3, in accordance with one embodiment.

FIG. 7B depicts a second exemplary graph plotting engine power percentage over the second time period in a liquid chromatography thermal system, such as the liquid chromatography thermal system 100 of FIG. 3, in accordance with one embodiment. The graph shows an engine power percentage plot 279 over the same period of time as the graph of FIG. 6A. The engine power percentage plot 279 begins to spike and then immediately decrease at or about the 3100 minute mark, at a similar point in time as the chamber temperature begins to increase. Here, the engine power percentage plot 279 continues to drop over time until at or about the 4200 minute mark. The engine power percentage plot 279 is shown beginning at or about 85%, but then drops to below 80% at or about the 3600 minute mark.

Figure 7C:
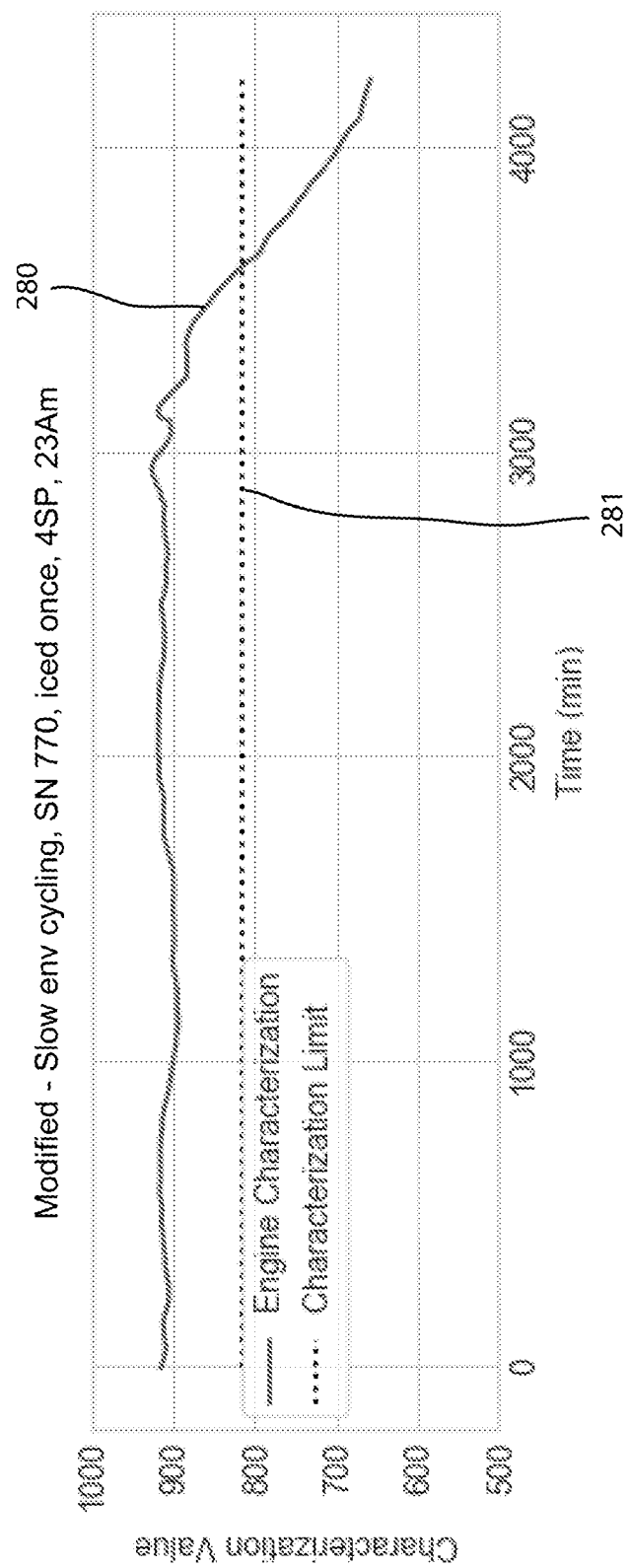
FIG. 7C depicts a third exemplary graph of engine characterization over the second time period in a liquid chromatography thermal system, such as the liquid chromatography thermal system of FIG. 3, in accordance with one embodiment.

FIG. 7C depicts a third exemplary graph of engine characterization over the second time period in a liquid chromatography thermal system, such as the liquid chromatography thermal system 100 of FIG. 3, in accordance with one embodiment. The graph of FIG. 7C shows an engine characterization plot 280 over time, along with a constant characterization limit 281. The engine characterization plot 280 may be a characterization of the efficiency of the engine, determined by the temperature and power information provided to the system by the sensors 110, 111, 112 and engine controller 113. As shown, the engine characterization plot 280 actually begins to drop at or about the 3100 minute point. As shown, a threshold characterization limit 281 may exist of at or about 820 in this embodiment. The engine characterization plot 280 is shown dropping below this characterization limit 281 at or about the 3700 minute mark. This may immediately trigger the defrost method 250, as described hereinabove.

Figure 8:
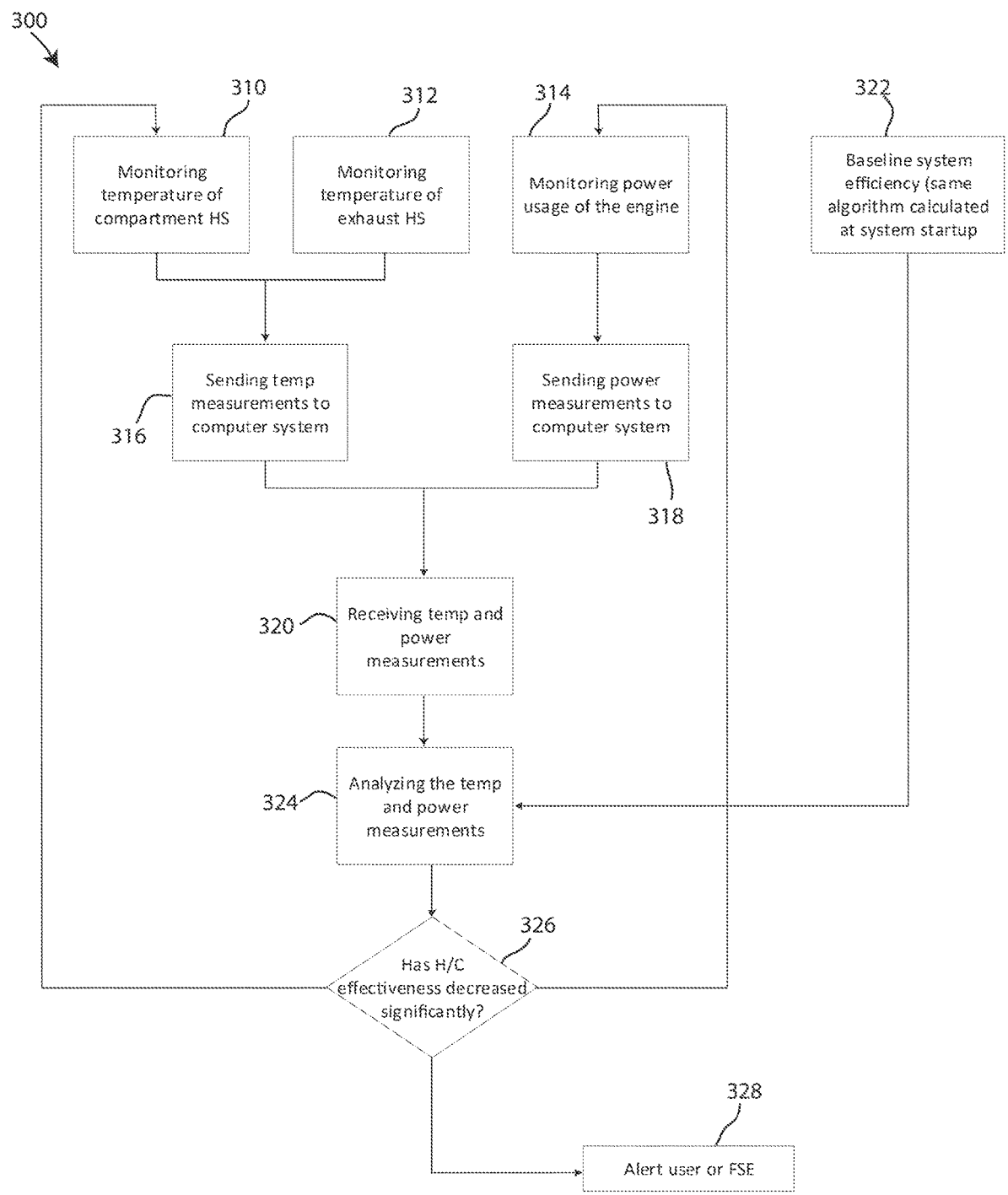
FIG. 8 depicts a flow chart of a method of predicting failure of an engine in a liquid chromatography thermal system, such as the liquid chromatography thermal system of FIG. 3, in accordance with one embodiment.
Figure 9:
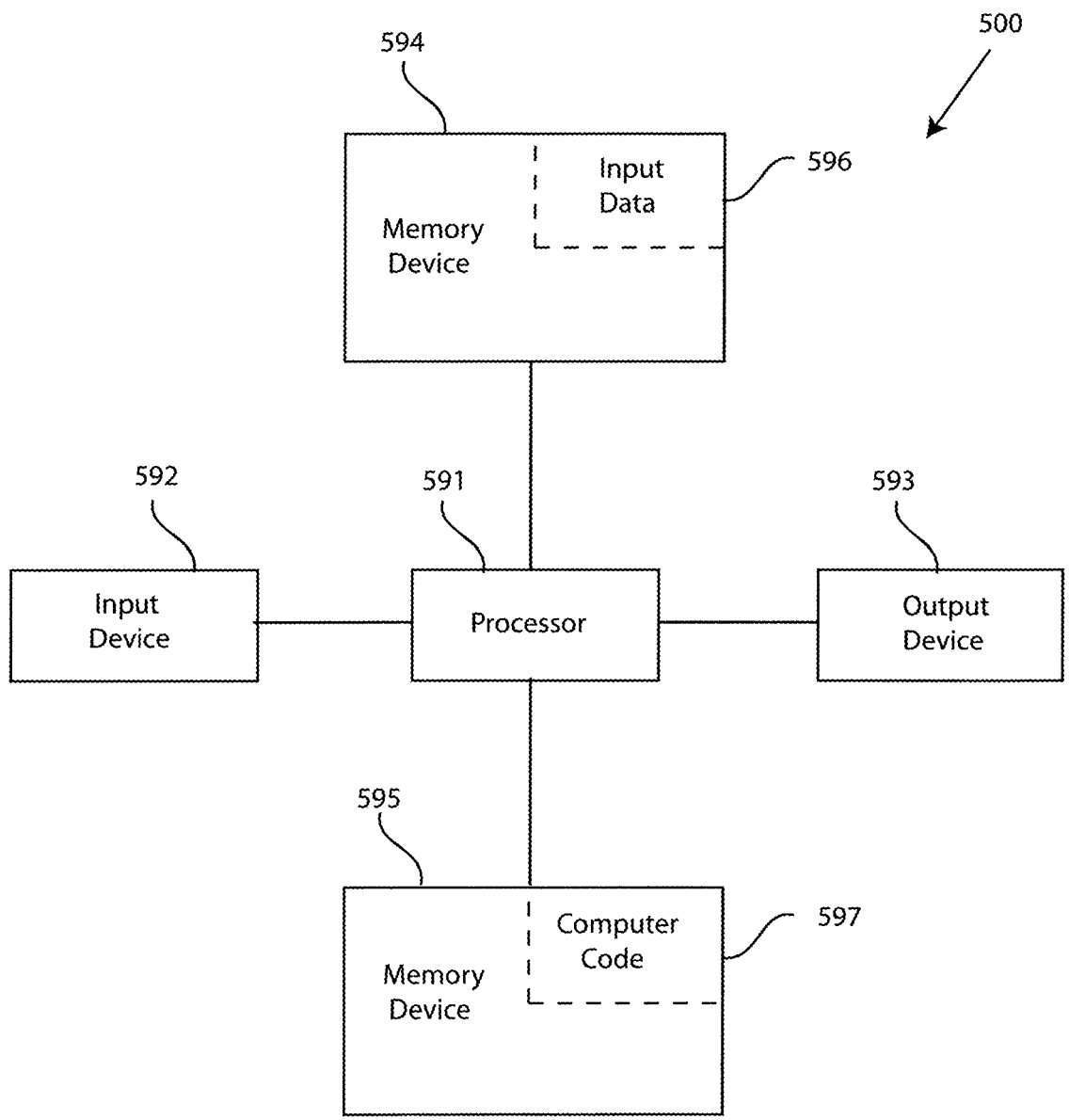
FIG. 9 depicts a block diagram of a computer system for system for determining a status of a thermal chamber in a liquid chromatography thermal system of FIG. 3, capable of implementing methods for determining a status of a thermal chamber in a liquid chromatography thermal system of FIGS. 4,5 and 8, in accordance with embodiments of the present invention.

FIG. 8 depicts a flow chart of a method 300 of predicting failure of an engine in a liquid chromatography thermal system, such as the liquid chromatography thermal system of FIG. 3, in accordance with one embodiment. The method 300 includes a step 310 of monitoring a temperature of a first side of a heat sink, the first side located in the compartment of the thermal system, along with a step 312 of monitoring a temperature of a second side of the heat sink, the second side being an exhaust side of the heat sink that may not be in the compartment of the thermal system. The method 300 further includes a step 314 of monitoring power usage of the engine. A step 316 includes sending the temperature measurements from steps 310 and 312 to a computer system, such as the computer system 120. A step 318 includes sending the power usage of the engine information or data to the computer system as well. At a step 320, the computer system receives the temperature and power measurements. At a step 322, a baseline system efficiency is calculated or determined or otherwise is known at system startup. At a step 324, the computer system analyzes the temperature and power measurements and compares these measurements to the known baseline system efficiency from step 322. At a step 326, the computer system determines whether heating and cooling effectiveness has decreased based on the analysis of the temperature and power measurements compared to the baseline system efficiency. At a step 328, the computer system 120 is configured to alert a user or field service engineer (FSE). This alert may be provided on, for example, a user interface of the chromatography system. FIG. 9 depicts a block diagram of a computer system for determining a status of a thermal chamber in a liquid chromatography thermal system 100 of FIG. 3, capable of implementing methods for determining a status of a thermal chamber in a liquid chromatography thermal system of FIGS. 4, 5 and 8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for determining a status of a thermal chamber in a liquid chromatography thermal system, in the manner prescribed by the embodiments of FIGS. 4,5 and 8, using the system for determining a status of a thermal chamber in a liquid chromatography thermal system of FIG. 3, wherein the instructions of the computer code 597 may be executed by processor 591 via memory device 595. The computer code 597 may include software or program instructions that may implement one or more algorithms for implementing the methods for determining a status of a thermal chamber in a liquid chromatography thermal system, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for determining a status of a thermal chamber in a liquid chromatography thermal system. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system for determining a status of a thermal chamber in a liquid chromatography thermal system. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for determining a status of a thermal chamber in a liquid chromatography thermal system. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for determining a status of a thermal chamber in a liquid chromatography thermal system.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes the following detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
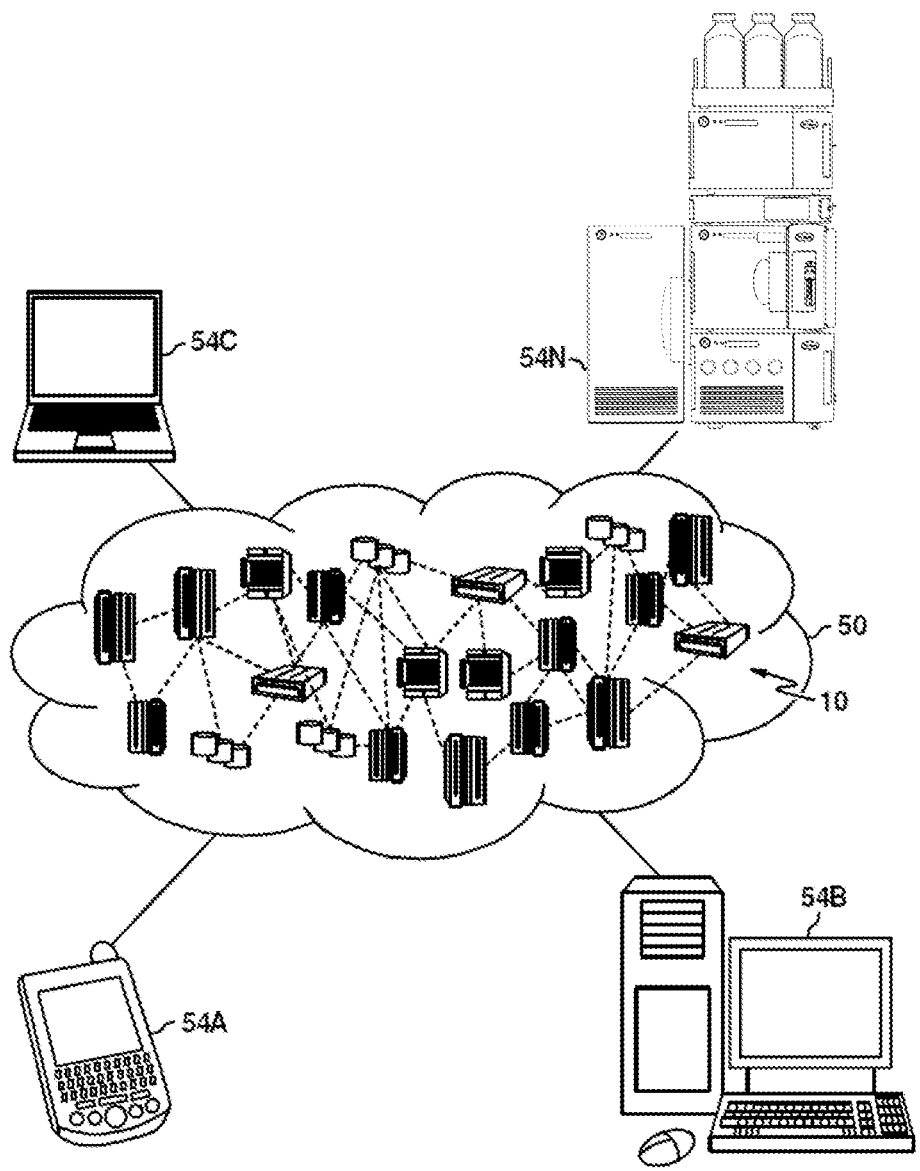
FIG. 10 depicts a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or liquid chromatography system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

The present invention may also be implemented, wholly or in part, in a cloud computing environment. For example, the computer system 120 and some or all of the various modules 131, 132, 133, 134 and functionality performed thereby, along with the data repository 125 and processor(s) 141 may be located on an off-site hosted cloud based system that may be connected to by the data system 34 or the host computing system 40. Whatever, the embodiment, thus, the cloud based processing may provide instructions to the engine 116 based on an off-site analysis and determining based on the information provided by the various diagnostic sensors 110, 111, 112 and engine controller 113 described herein above. Thus, with further reference to FIG. 10, the cellular telephone 54A, the desktop computer 54B, the laptop computer 54C may each be exemplary forms of the host computing system 40 that is configured to provide user inputs and monitoring capabilities for the above-described system for detecting or preventing ice in a liquid chromatography thermal system 100. Alternatively, the desktop computer 54A shown may be representative of a cloud based computer system 120 for providing calculations and controlling, remotely, the liquid chromatography system 10. As shown in FIG. 10, elements of, or a computer system of, the liquid chromatography system 54N may further be connected to the cloud as well to accommodate the methods for detecting or preventing ice in a liquid chromatography thermal system described herein.

Figure 11:
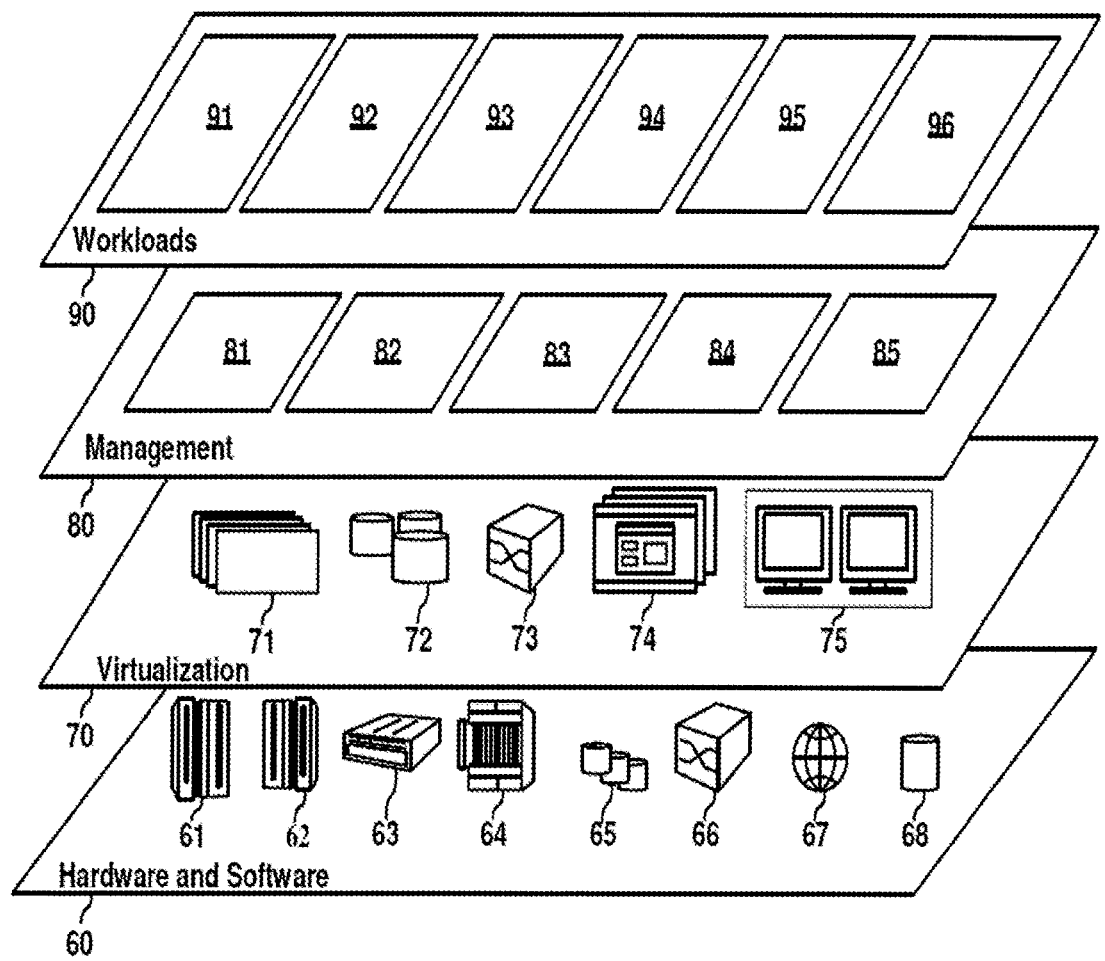
FIG. 11 depicts abstraction model layers, in accordance with embodiments of the present invention.

Referring now to FIG. 11, a set of functional abstraction layers provided by cloud computing environment 50 (see FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processes for detecting and preventing ice prevention 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A liquid chromatography system comprising:
   a solvent delivery system;
   a sample delivery system in fluidic communication with the solvent delivery system;
   a liquid chromatography column located downstream from the solvent delivery system and the sample delivery system;
   a detector located downstream from the liquid chromatography column;
   a thermal chamber housing at least one of the solvent delivery system, the sample delivery system, the liquid chromatography column and the detector;
   an engine configured to control the temperature in the thermal chamber;
   a heat sink operably connected to the engine;
   a first temperature sensor within the thermal chamber;
   a second temperature sensor;
   a computer system configured to receive temperature information from each of the first and second temperature sensors, the computer system comprising:
      one or more processors;
      one or more memory devices coupled to the one or more processors; and
      one or more computer readable storage devices coupled to the one or more processors, wherein the one or more storage devices contain program code executable by the one or more processors via the one or more memory devices to implement a method for controlling the temperature in the thermal chamber, the method comprising:
         receiving, by the computer system, a first temperature measurement from the first temperature sensor;
         receiving, by the computer system, a second temperature measurement from the second temperature sensor;
         receiving, by the computer system, power information related to power utilized by the engine;
         analyzing, by the one or more processors, the first and second temperature measurements and the power information;
         determining, by the one or more processors, a current engine characterization, wherein the current engine characterization is a function of the first and second temperature measurements and the power information;
         determining, by the one or more processors, that ice has formed on the heat sink based on the first and second temperature measurements and the power information, wherein a characterization limit is defined such that the determining that ice has formed includes determining that the current engine characterization is below the characterization limit; and
         determining, by the one or more processors, a status of the thermal chamber based on the analyzing the first and second temperature measurements and the power information.

2. The liquid chromatography system of claim 1, wherein the first temperature sensor is located on a first side of the heat sink and wherein the second temperature sensor is located on a second side of the heat sink that is opposite the first side, the method further comprising:

predicting, by the one or more processors, engine failure based on the analyzing the first and second temperature measurements and the power information.

3. The liquid chromatography system of claim 2, wherein the first side of the heat sink is an intake side, and wherein the second side of the heat sink is an exhaust side.

4. The liquid chromatography system of claim 1, wherein the first temperature sensor is located on the heat sink and the second temperature sensor is configured to monitor the temperature within the thermal chamber, the method further comprising:

determining, by the one or more processors, whether ice has formed on the heat sink based on the first and second temperature measurements and the power information; and operating, by the engine, a defrost process on the heat sink when the one or more processors determine that ice has formed on the heat sink.

5. The liquid chromatography system of claim 4, further comprising:

a third temperature sensor configured to sense an ambient temperature outside the thermal chamber, the method further comprising:

receiving, by the computer system, a third temperature measurement from the third temperature sensor;

analyzing, by the one or more processors, the first, second and third temperature measurements and the power information; and determining, by the one or more processors, whether ice has formed on the heat sink based on the first, second and third temperature measurements and the power information.

6. The liquid chromatography system of claim 5, wherein the method for controlling temperature in the thermal chamber further comprises:

continually monitoring, with the first temperature sensor controlled by the computer system, the temperature of the heat sink;

continuously providing, by the first temperature sensor, temperature information of the heat sink to the computer system;

continually monitoring, with the second temperature sensor controlled by the computer system, the temperature of the thermal chamber;

continuously providing, by the second temperature sensor, temperature information of the thermal chamber to the computer system;

continually monitoring, with the third temperature sensor controlled by the computer system, the ambient temperature outside of the thermal chamber;

continuously providing, by the third temperature sensor, ambient temperature information outside of the thermal chamber to the computer system, continuously analyzing, by the one or more processors, the temperature information of the heat sink, the temperature information of the thermal chamber, and the ambient temperature information outside of the thermal chamber, and the current engine characterization of the engine; and continuously determining, by the one or more processors, whether ice has formed on the heat sink based on the temperature information of the heat sink, the temperature information of the thermal chamber, and the ambi-
ent temperature information outside of the thermal chamber, and the current engine characterization of the engine.

7. The liquid chromatography system of claim 4, wherein the operating the defrost process further comprises operating a defrost cycle that includes the steps of:

determining, by the one or more processors and the second temperature sensor, a compartment start temperature;

after the determining the compartment start temperature, increasing a temperature setpoint of the heat sink by a predetermined number of degrees;

a) after the increasing the temperature setpoint of the heat sink, waiting a predetermined period of time;

b) after the waiting the predetermined period of time, determining, by the one or more processors and the second temperature sensor, a compartment current temperature;

c) after the determining the compartment current temperature, determining, by the one or more computer processors, whether a change in temperature between the compartment start temperature and the compartment current temperature is greater than a predetermined threshold temperature change;

continuing to repeat steps a)—c) until it is determined by the one or more computer processors that the change in temperature between the compartment start temperature and the compartment current temperature is greater than the predetermined threshold temperature change.

8. The liquid chromatography system of claim 7, wherein the temperature setpoint of the heat sink setpoint is increased above 0° C.

9. The liquid chromatography system of claim 7, wherein the continuing to repeat steps a)—c) occurs for a predetermined number of cycles, and after the predetermined number of cycles the defrost cycle further includes the step of aborting the defrost cycle after the predetermined number of cycles.

10. The liquid chromatography system of claim 7, wherein the predetermined threshold temperature change is between 0.5° C. and 1.2° C.

11. The liquid chromatography system of claim 4, further comprising a sample manager, the sample manager housing the solvent delivery system, the sample delivery system, the liquid chromatography column, the detector and the thermal chamber, the sample manager configured for high performance liquid chromatography.

12. The liquid chromatography system of claim 4, setting the setpoint of the heat sink to less than 0° C. prior to the operating the defrost process.

13. A method for determining a status of a thermal chamber in a liquid chromatography system, the method comprising:

receiving, by a computer system, a first temperature measurement from a first temperature sensor located in the thermal chamber;

receiving, by the computer system, a second temperature measurement from a second temperature sensor;

receiving, by the computer system, power information related to power utilized by an engine;

analyzing, by one or more processors of the computer system, the first and second temperature measurements and the power information;

determining, by the one or more processors, a current engine characterization, wherein the current engine characterization is a function of the first and second temperature measurements and the power information;

determining, by the one or more processors, that ice has formed on the heat sink based on the first and second temperature measurements and the power information, wherein a characterization limit is defined such that the determining that ice has formed includes determining that the current engine characterization is below the characterization limit; and determining, by the one or more processors, a status of the thermal chamber based on the analyzing the first and second temperature measurements and the power information.

14. The method of claim 13, wherein the first temperature sensor is located on a first side of the heat sink and wherein the second temperature sensor is located on a second side of the heat sink that is opposite the first side, the method further comprising:

predicting, by the one or more processors, engine failure based on the analyzing the first and second temperature measurements and the power information.

15. The method of claim 14, wherein the first side of the heat sink is an intake side, and wherein the second side of the heat sink is an exhaust side.

16. The method of claim 13, wherein the first temperature sensor is located on the heat sink and the second temperature sensor is configured to monitor the temperature within the thermal chamber, the method further comprising:

operating, by the engine, a defrost process on the heat sink when the one or more processors determine that ice has formed on the heat sink.

17. The method of claim 16, further comprising:

receiving, by the computer system, a third temperature measurement of an ambient environment outside the thermal chamber from a third temperature sensor located outside the thermal chamber exposed to the ambient environment;

analyzing, by the one or more processors of the computer system, the first, second and third temperature measurements and the power information; and determining, by the one or more processors, whether ice has formed on the heat sink based on the first, second and third temperature measurements and the power information.

18. The method of claim 17, further comprising:

continually monitoring, with the first temperature sensor controlled by the computer system, the temperature of the heat sink;

continuously providing, by the first temperature sensor, temperature information of the heat sink to the computer system;

continually monitoring, with the second temperature sensor controlled by the computer system, the temperature of the thermal chamber;

continuously providing, by the second temperature sensor, temperature information of the thermal chamber to the computer system;

continually monitoring, with the third temperature sensor controlled by the computer system, the ambient temperature outside of the thermal chamber;

continuously providing, by the third temperature sensor, ambient temperature information outside of the thermal chamber to the computer system, continuously analyzing, by the one or more processors, the temperature information of the heat sink, the temperature information of the thermal chamber, and the ambient temperature information outside of the thermal chamber, and the current engine characterization of the engine; and continuously determining, by the one or more processors, whether ice has formed on the heat sink based on the temperature information of the heat sink, the temperature information of the thermal chamber, and the ambient temperature information outside of the thermal chamber, and the current engine characterization of the engine.

19. The method of claim 16, wherein the operating the defrost process further comprises operating a defrost cycle that includes the steps of:

determining, by the one or more processors and the second temperature sensor, a compartment start temperature;

after the determining the compartment start temperature, increasing a temperature setpoint of the heat sink by a predetermined number of degrees;

a) after the increasing the temperature setpoint of the heat sink, waiting a predetermined period of time;

b) after the waiting the predetermined period of time, determining, by the one or more processors and the second temperature sensor, a compartment current temperature;

c) after the determining the compartment current temperature, determining, by the one or more computer processors, whether a change in temperature between the compartment start temperature and the compartment current temperature is greater than a predetermined threshold temperature change;

continuing to repeat steps a)—c) until it is determined by the one or more computer processors that the change in temperature between the compartment start temperature and the compartment current temperature is greater than the predetermined threshold temperature change.

20. The method of claim 19, wherein the temperature setpoint of the heat sink setpoint is increased above 0° C.

21. The method of claim 19, wherein the continuing to repeat steps a)—c) occurs for a predetermined number of cycles, and after the predetermined number of cycles the defrost cycle further includes the step of aborting the defrost cycle after the predetermined number of cycles.

22. The method of claim 19, wherein the predetermined threshold temperature change is between 0.5° C. and 1.2° C.

23. The method of claim 16, further comprising setting the setpoint of the heat sink to less than 0° C. prior to the operating the defrost process.

24. A liquid chromatography sample manager comprising:

a sample delivery system configured to provide a sample to a liquid chromatography column located downstream from the sample delivery system;

a thermal chamber housing the sample delivery system;

an engine configured to control temperature in the thermal chamber;

a heat sink operably connected to the engine;

a first temperature sensor within the thermal chamber;

a second temperature sensor;

a computer system configured to receive temperature information from each of the first and second temperature sensors, the computer system comprising:

one or more processors;

one or more memory devices coupled to the one or more processors; and one or more computer readable storage devices coupled to the one or more processors, wherein the one or more storage devices contain program code executable by the one or more processors via the one or more memory devices to implement a method for controlling temperature in the thermal chamber, the method comprising:

receiving, by the computer system, a first temperature measurement from the first temperature sensor;

receiving, by the computer system, a second temperature measurement from the second temperature sensor;

receiving, by the computer system, power information related to power utilized by the engine;

analyzing, by the one or more processors, the first and second temperature measurements and the power information;

determining, by the one or more processors, a current engine characterization, wherein the current engine characterization is a function of the first and second temperature measurements and the power information;

determining, by the one or more processors, that ice has formed on the heat sink based on the first and second temperature measurements and the power information, wherein a characterization limit is defined such that the determining that ice has formed includes determining that the current engine characterization is below the characterization limit; and determining, by the one or more processors, a status of the thermal chamber based on the analyzing the first and second temperature measurements and the power information.

25. The liquid chromatography sample manager of claim 24, wherein the first temperature sensor is located on a first side of the heat sink and wherein the second temperature sensor is located on a second side of the heat sink that is opposite the first side, the method further comprising:

predicting, by the one or more processors, engine failure based on the analyzing the first and second temperature measurements and the power information.

26. The liquid chromatography sample manager of claim 25, wherein the first side of the heat sink is an intake side, and wherein the second side of the heat sink is an exhaust side.

27. The liquid chromatography sample manager of claim 24, wherein the first temperature sensor is located on the heat sink and the second temperature sensor is configured to monitor the temperature within the thermal chamber, the method further comprising:

determining, by the one or more processors, whether ice has formed on the heat sink based on the first and second temperature measurements and the power information; and operating, by the engine, a defrost process on the heat sink when the one or more processors determine that ice has formed on the heat sink.

28. The liquid chromatography sample manager of claim 27, further comprising:

a third temperature sensor configured to sense an ambient temperature outside the thermal chamber, the method further comprising:

receiving, by the computer system, a third temperature measurement from the third temperature sensor;

analyzing, by the one or more processors, the first, second and third temperature measurements and the power information; and determining, by the one or more processors, whether ice has formed on the heat sink based on the first, second and third temperature measurements and the power information.

29. The liquid chromatography sample manager of claim 28, wherein the method for controlling temperature in the thermal chamber further comprises:

continually monitoring, with the first temperature sensor controlled by the computer system, the temperature of the heat sink;

continuously providing, by the first temperature sensor, temperature information of the heat sink to the computer system;

continually monitoring, with the second temperature sensor controlled by the computer system, the temperature of the thermal chamber;

continuously providing, by the second temperature sensor, temperature information of the thermal chamber to the computer system;

continually monitoring, with the third temperature sensor controlled by the computer system, the ambient temperature outside of the thermal chamber;

continuously providing, by the third temperature sensor, ambient temperature information outside of the thermal chamber to the computer system, continuously analyzing, by the one or more processors, the temperature information of the heat sink, the temperature information of the thermal chamber, and the ambient temperature information outside of the thermal chamber, and the current engine characterization of the engine; and continuously determining, by the one or more processors, whether ice has formed on the heat sink based on the temperature information of the heat sink, the temperature information of the thermal chamber, and the ambient temperature information outside of the thermal chamber, and the current engine characterization of the engine.

30. The liquid chromatography sample manager of claim 27, wherein the operating the defrost process further comprises operating a defrost cycle that includes the steps of:

determining, by the one or more processors and the second temperature sensor, a compartment start temperature;

after the determining the compartment start temperature, increasing a temperature setpoint of the heat sink by a predetermined number of degrees;

a) after the increasing the temperature setpoint of the heat sink, waiting a predetermined period of time;

b) after the waiting the predetermined period of time, determining, by the one or more processors and the second temperature sensor, a compartment current temperature;

c) after the determining the compartment current temperature, determining, by the one or more computer processors, whether a change in temperature between the compartment start temperature and the compartment current temperature is greater than a predetermined threshold temperature change;

continuing to repeat steps a)—c) until it is determined by the one or more computer processors that the change in temperature between the compartment start temperature and the compartment current temperature is greater than the predetermined threshold temperature change.

* * * * *